US010119749B2

(12) United States Patent
Baek et al.

(10) Patent No.: US 10,119,749 B2
(45) Date of Patent: Nov. 6, 2018

(54) REFRIGERATOR

(71) Applicant: Samsung Electronics Co., Ltd., Suwon-si (KR)

(72) Inventors: Jae Ho Baek, Seoul (KR); Yong Soo Kyong, Seoul (KR); Jea Won Lee, Hwaseong-si (KR); Jeong Su Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 104 days.

(21) Appl. No.: 14/914,997

(22) PCT Filed: Aug. 26, 2014

(86) PCT No.: PCT/KR2014/007924
§ 371 (c)(1),
(2) Date: Feb. 26, 2016

(87) PCT Pub. No.: WO2015/034199
PCT Pub. Date: Mar. 12, 2015

(65) Prior Publication Data
US 2016/0209104 A1 Jul. 21, 2016

(30) Foreign Application Priority Data

Sep. 5, 2013 (KR) .................. 10-2013-0106868

(51) Int. Cl.
*B01F 3/04* (2006.01)
*A23L 2/04* (2006.01)
(Continued)

(52) U.S. Cl.
CPC ............... *F25D 23/12* (2013.01); *A23L 2/04* (2013.01); *A23L 2/38* (2013.01); *B01F 3/04106* (2013.01);
(Continued)

(58) Field of Classification Search
CPC .............. B01F 3/04106; B01F 3/04439; B01F 3/04808; F25D 23/12; A23L 2/38; A23L 2/54; A23L 2/00
(Continued)

(56) References Cited

U.S. PATENT DOCUMENTS 4,850,269 A * 7/1989 Hancock ............. B01F 3/04241
261/140.1
5,947,334 A 9/1999 Rudick et al.
(Continued)

FOREIGN PATENT DOCUMENTS

CA 2122053 3/1994
CN 85202864 10/1986
(Continued)

OTHER PUBLICATIONS

Extended European Search Report dated Mar. 30, 2017 in European Patent Application No. 14843060.6.
(Continued)

*Primary Examiner* — Robert A Hopkins
(74) *Attorney, Agent, or Firm* — Staas & Halsey LLP

(57) ABSTRACT

A refrigerator having a carbonated water production device, according to one concept of the present invention, comprises: a pressure regulator for adjusting and emitting the pressure of carbon dioxide emitted from a carbon dioxide cylinder; a solenoid switch valve for controlling the supply of the carbon dioxide discharged from the pressure regulator to a carbonated water tank; a connection channel for connecting the pressure regulator and the solenoid switch valve; and a relief valve arranged in the connection channel so as to discharge the carbon dioxide of the connection channel to the atmosphere if the pressure of the carbon dioxide of the connection channel is greater than a predetermined pressure limit. Thus, the pressure of the carbon dioxide of the
(Continued)

connection channel is capable of being maintained at a predetermined pressure limit or less, and solenoid malfunction can be prevented so as to improve reliability and stability of a system.

17 Claims, 19 Drawing Sheets

(51) Int. Cl.
 *F25D 23/12* (2006.01)
 *B67D 1/00* (2006.01)
 *A23L 2/38* (2006.01)

(52) U.S. Cl.
 CPC ...... *B01F 3/04439* (2013.01); *B01F 3/04808* (2013.01); *B01F 3/04815* (2013.01); *B67D 1/0062* (2013.01); *F25D 23/126* (2013.01); *A23V 2002/00* (2013.01); *B01F 2003/04822* (2013.01)

(58) Field of Classification Search
 USPC .......................... 261/64.3, 65, 119.1, DIG. 7
 See application file for complete search history.

(56) References Cited

U.S. PATENT DOCUMENTS

| 7,114,707 | B2* | 10/2006 | Rona | B01F 3/04531 |
| | | | | 261/119.1 |
| 9,723,863 | B2* | 8/2017 | Njaastad | A23L 2/54 |
| 2004/0124548 | A1 | 7/2004 | Rona et al. | |

FOREIGN PATENT DOCUMENTS

| CN | 2159666 | 3/1994 |
| CN | 1537028 | 10/2004 |
| DE | 4228771 | 3/1994 |
| EP | 2070586 | 6/2009 |
| EP | 2070586 | 5/2013 |
| GB | 2029251 | 3/1980 |
| JP | 10-59495 | 3/1998 |
| JP | 5675267 | 2/2015 |
| KR | 10-2002-0049626 | 6/2002 |
| KR | 10-2011-0011391 | 2/2011 |

OTHER PUBLICATIONS

Chinese Office Action dated May 10, 2017 in Chinese Patent Application No. 201480048927.0.
Korean Office Action dated Aug. 16, 2017 in Korean Patent Application No. 10-2013-0106868.
European Notice of Allowance dated Feb. 26, 2018 in European Patent Application No. 14843060.6.
Korean Office Action dated Feb. 26, 2018 in Korean Patent Application No. 10-2013-0106868.
Chinese Office Action dated Jan. 19, 2018 in Chinese Patent Application No. 201480048927.0.
Korean Notice of Allowance dated Apr. 27, 2018 in Korean Patent Application No. 10-2013-0106868.

* cited by examiner

[Fig. 1]
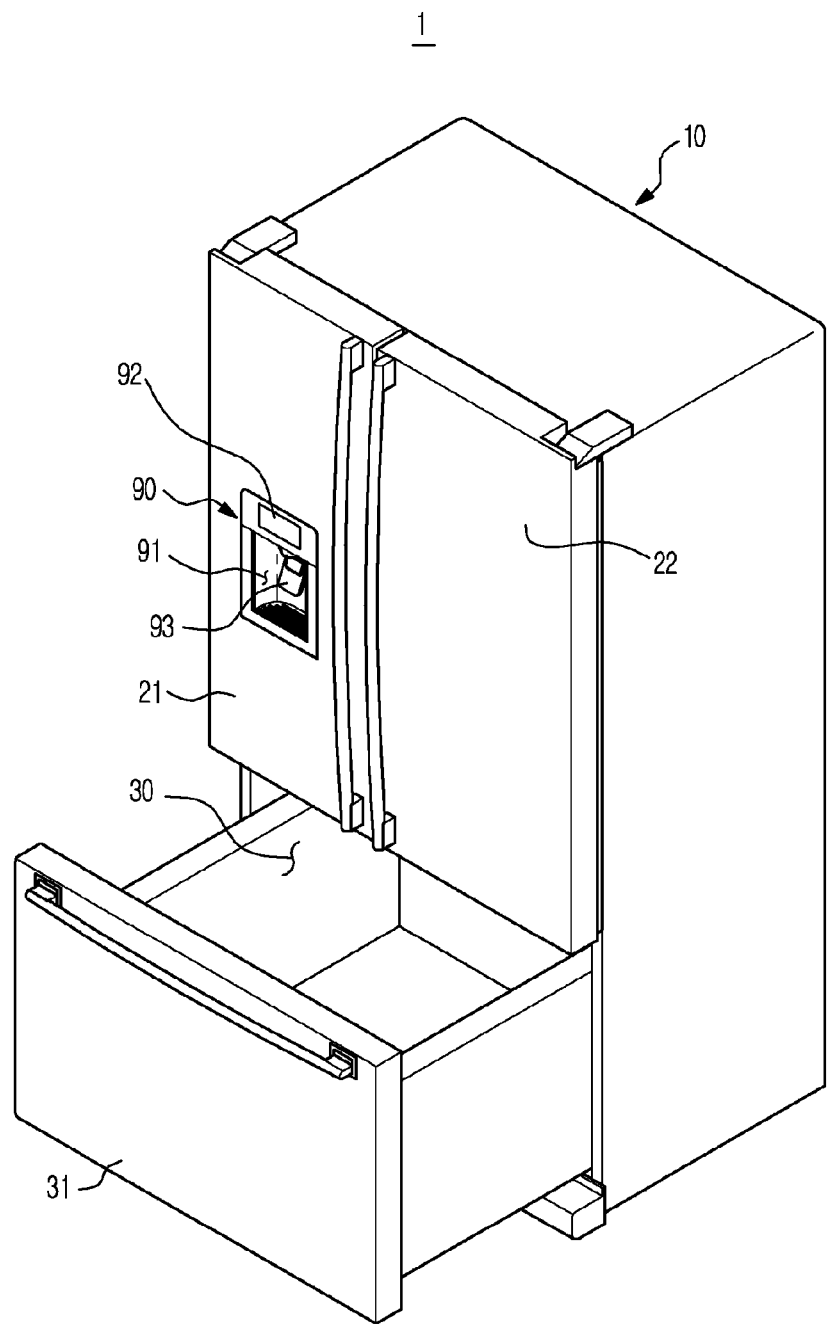

[Fig. 2]
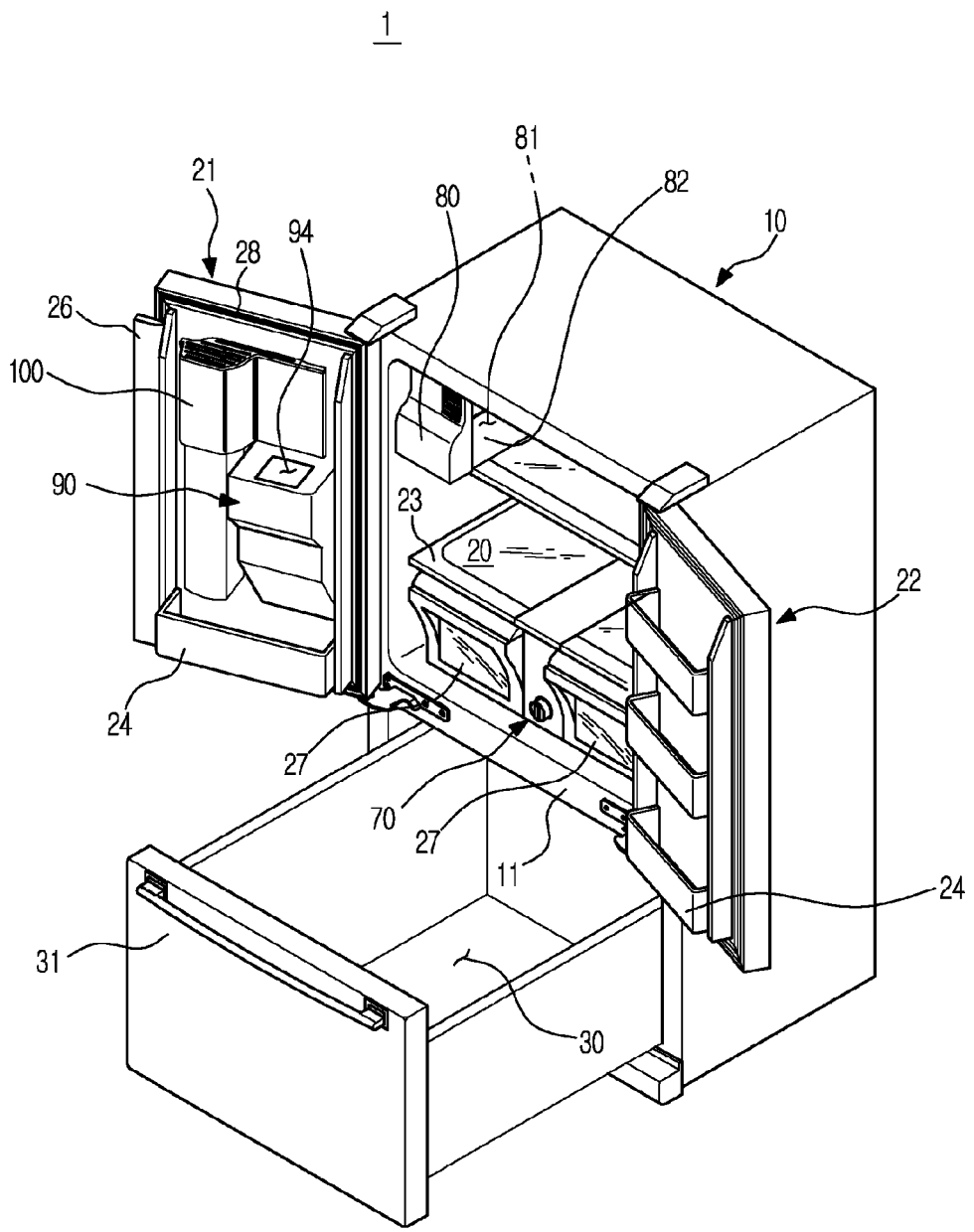

[Fig. 3]
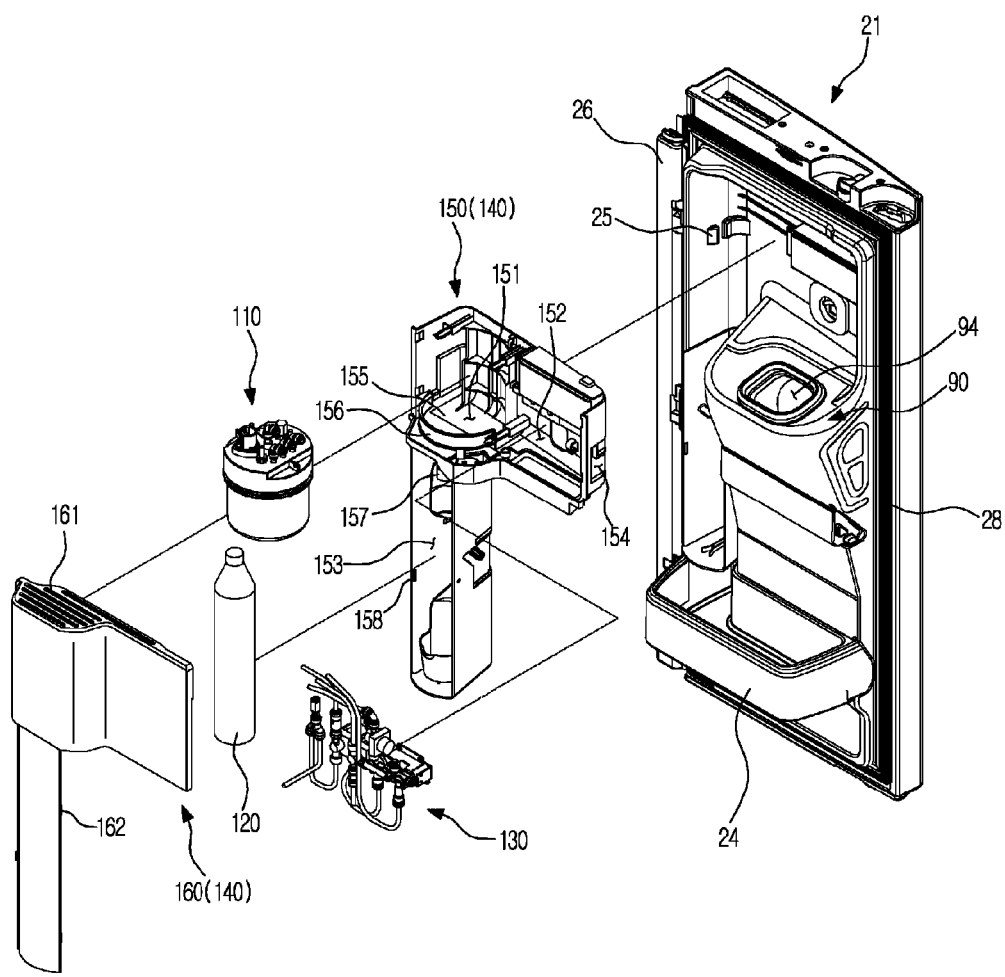

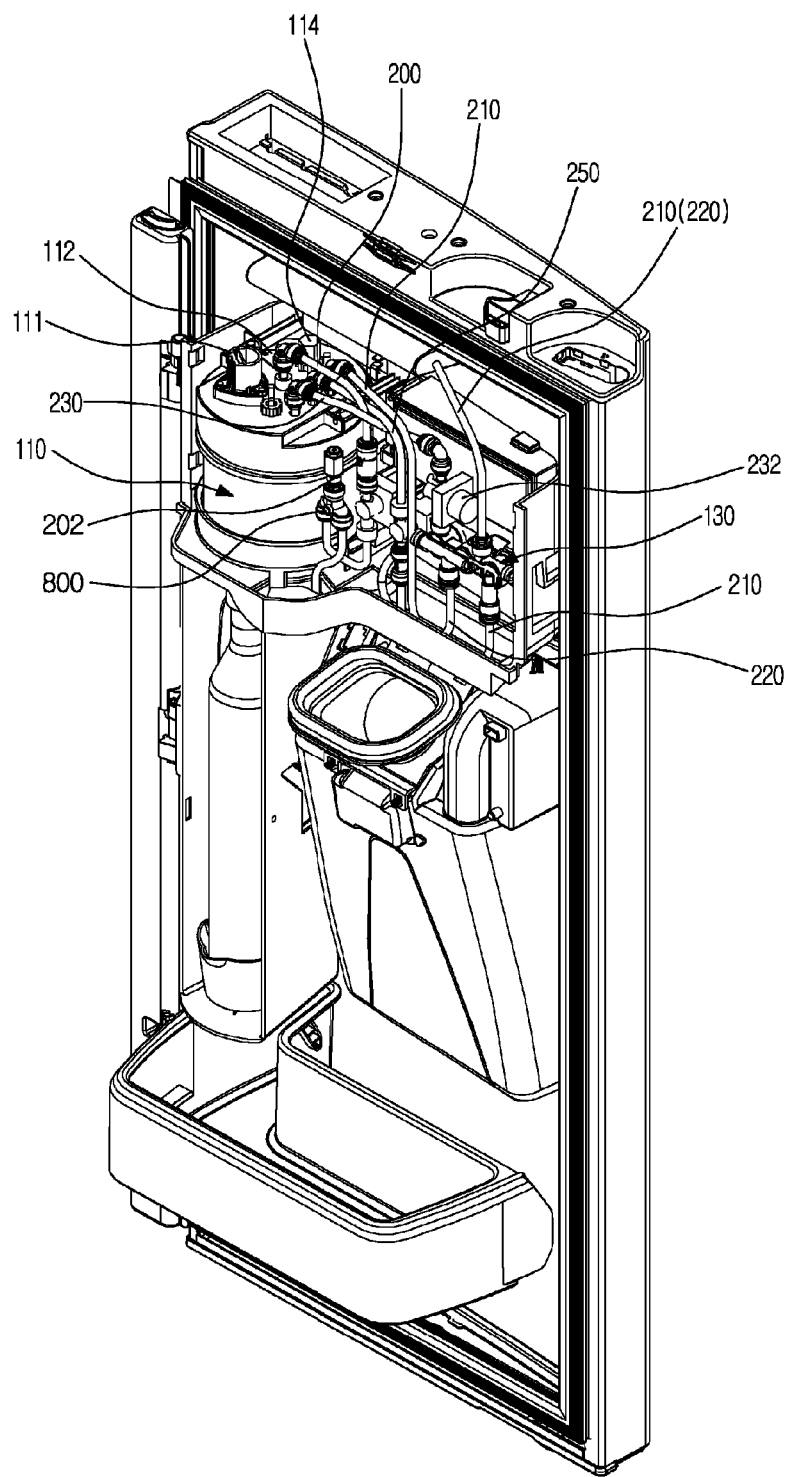
[Fig. 4]

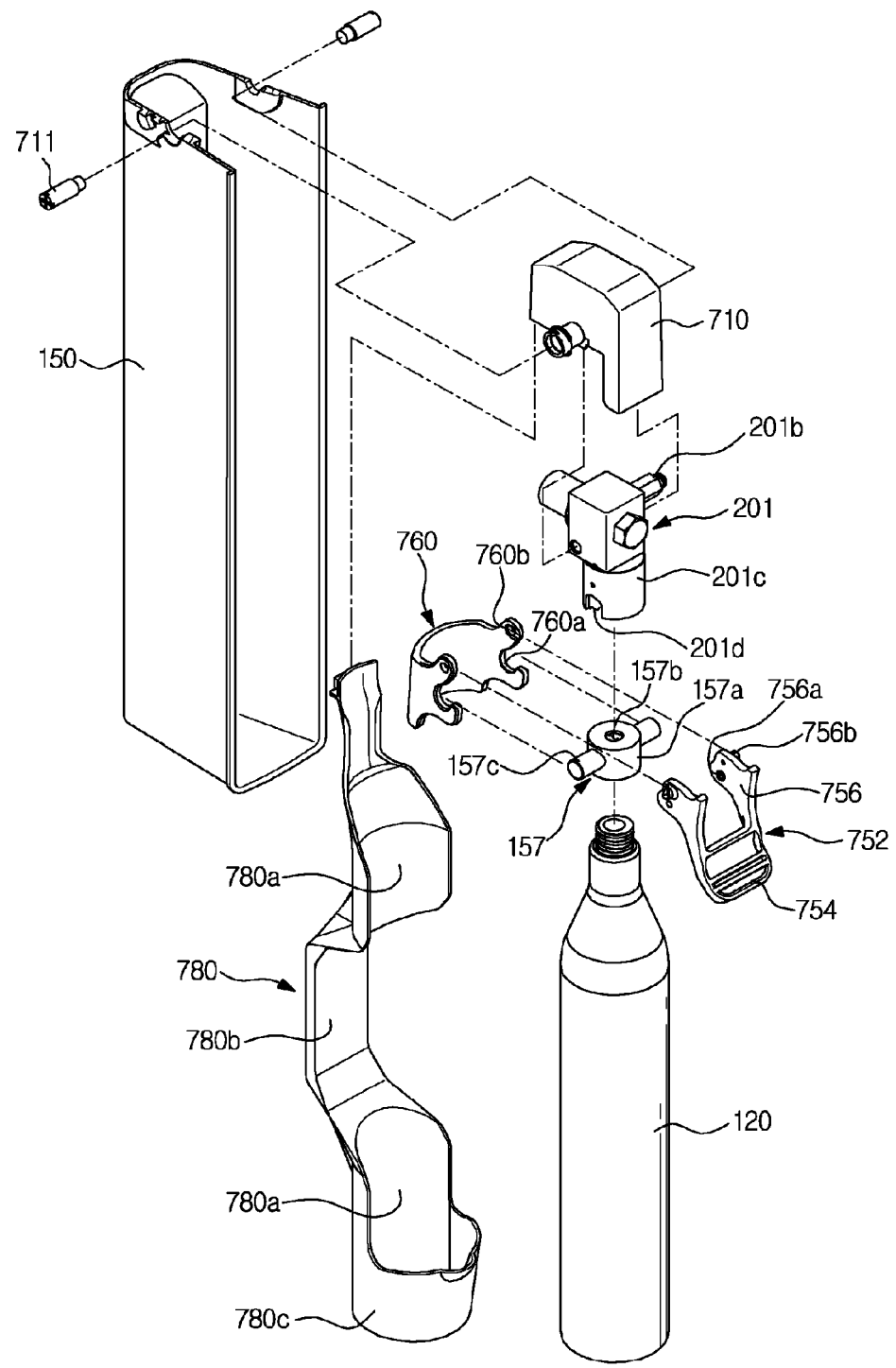
[Fig. 5]

[Fig. 6]
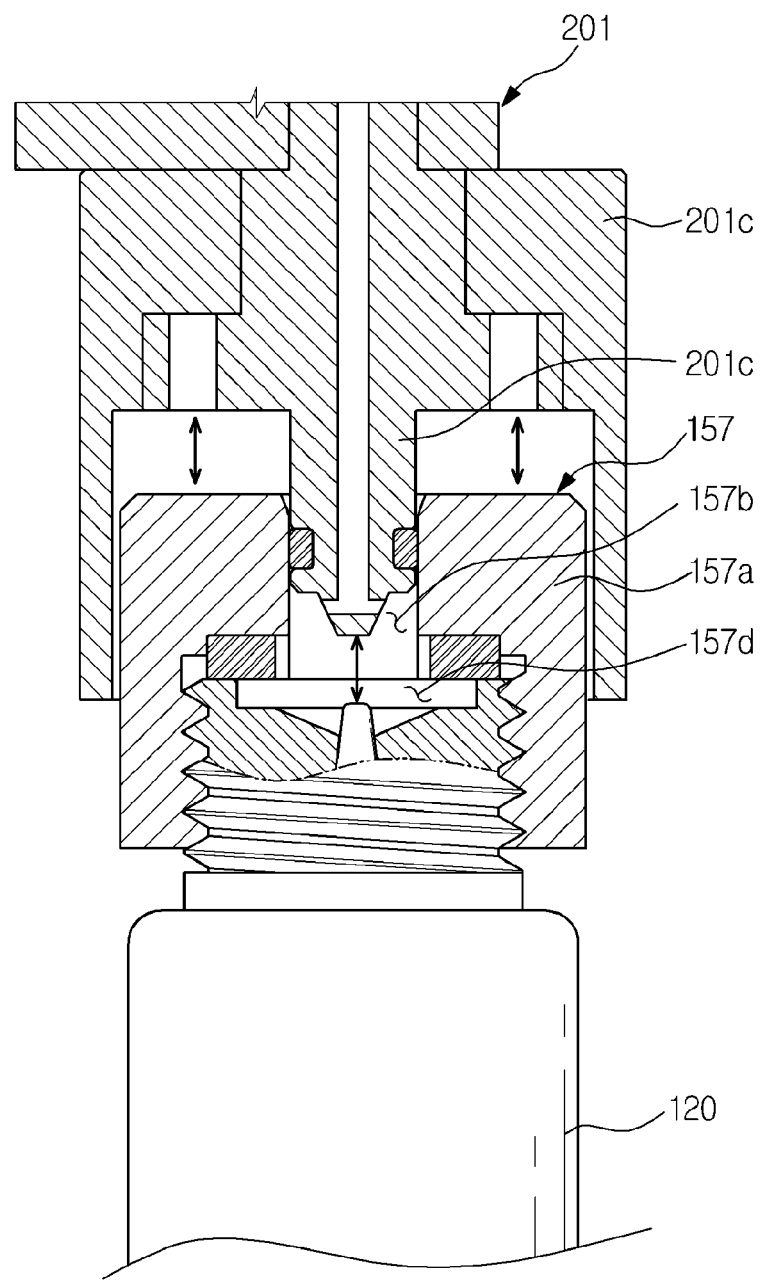

[Fig. 7]
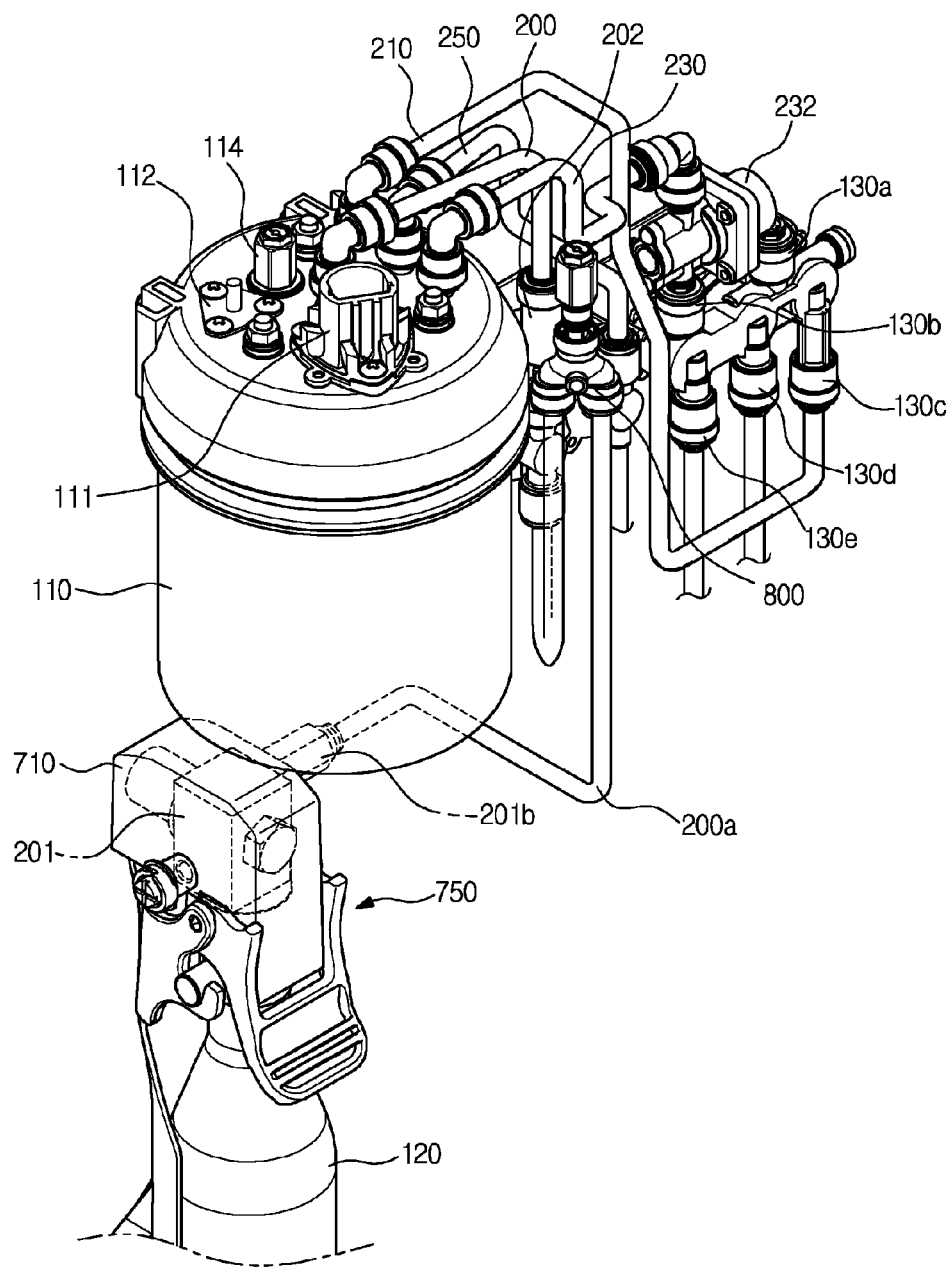

[Fig. 8]
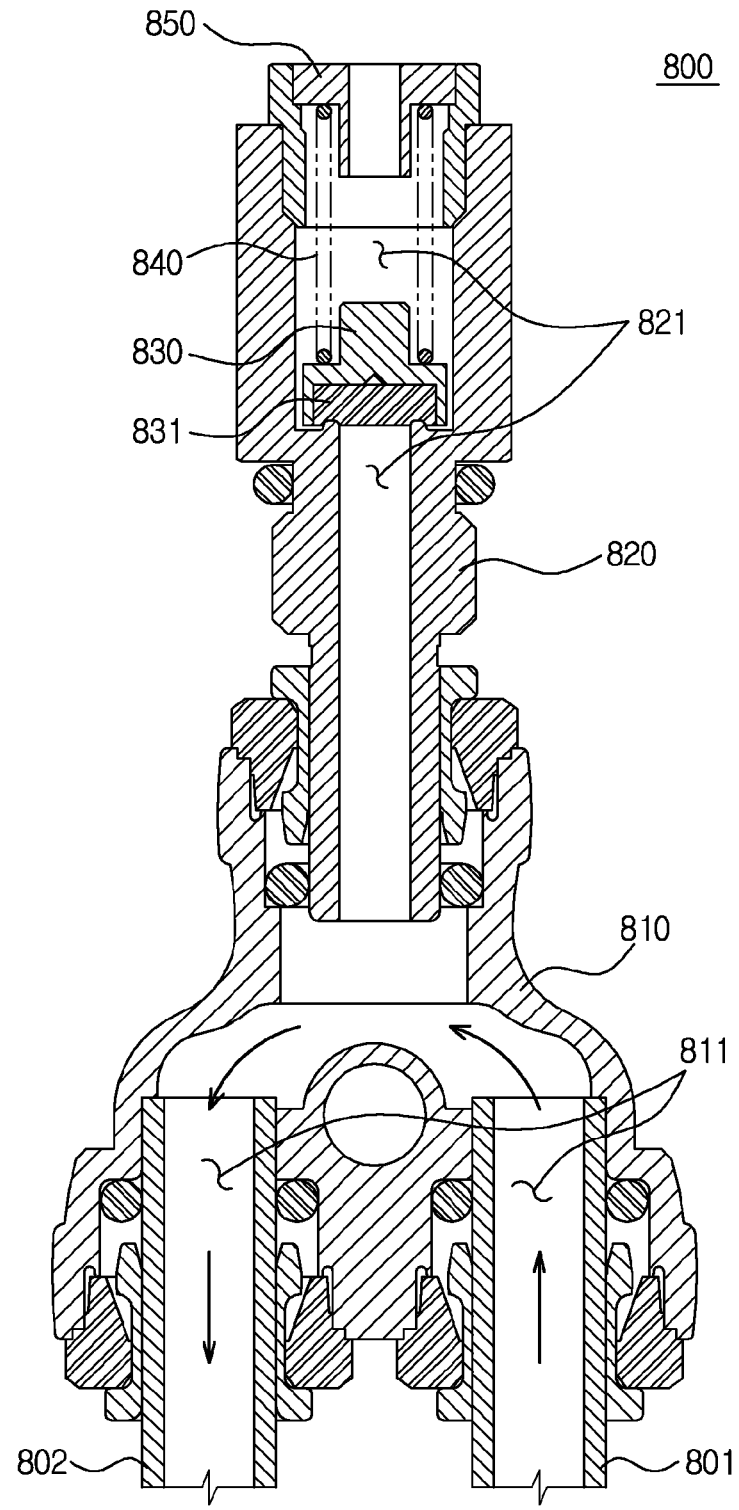

[Fig. 9]
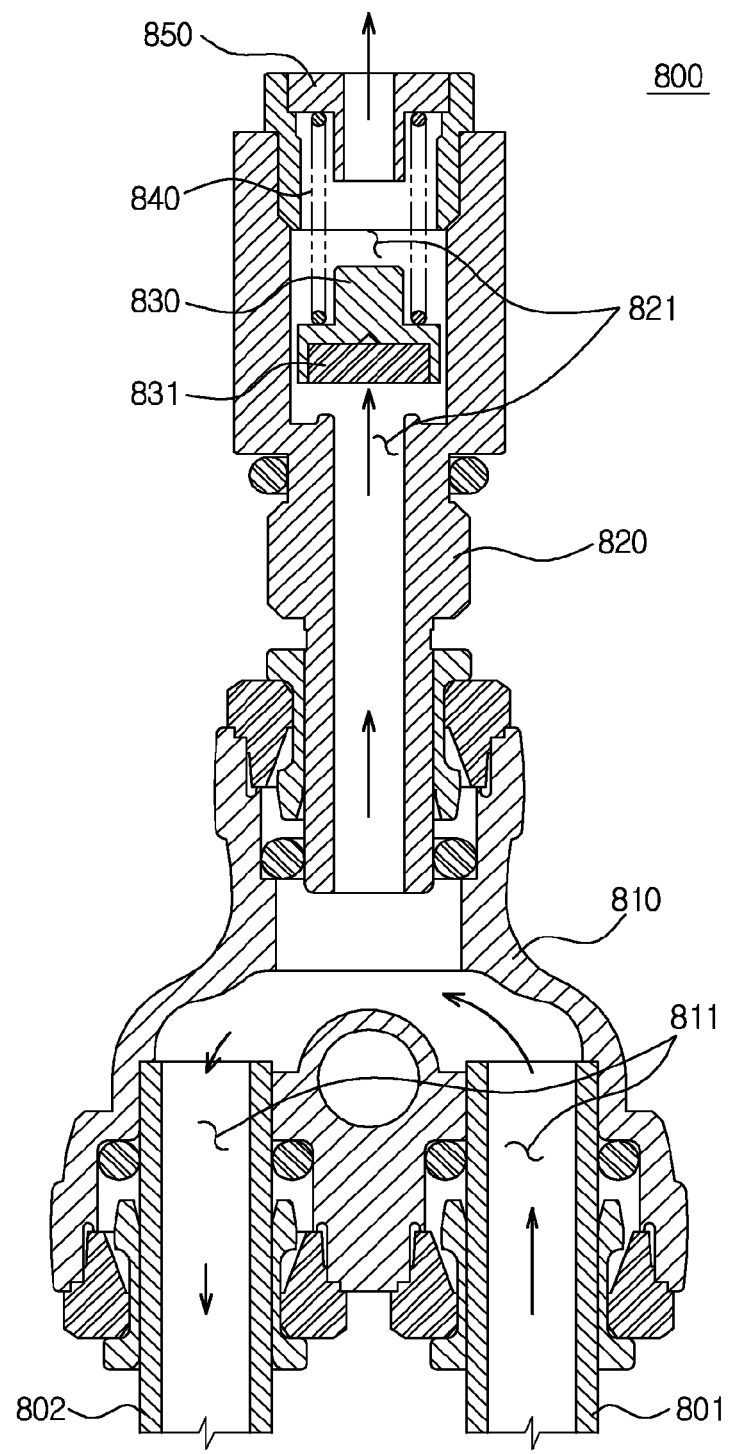

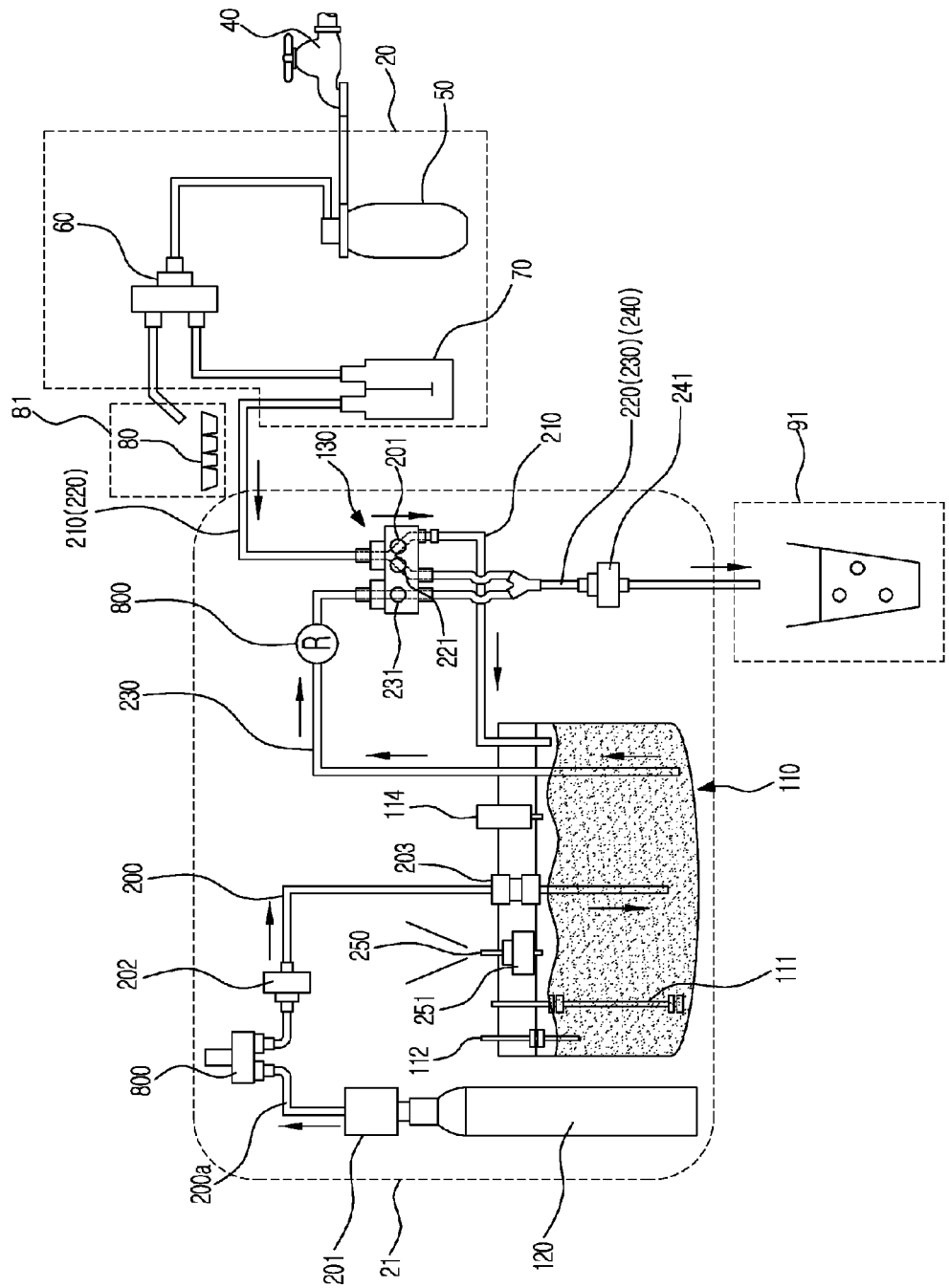
[Fig. 10]

[Fig. 11]
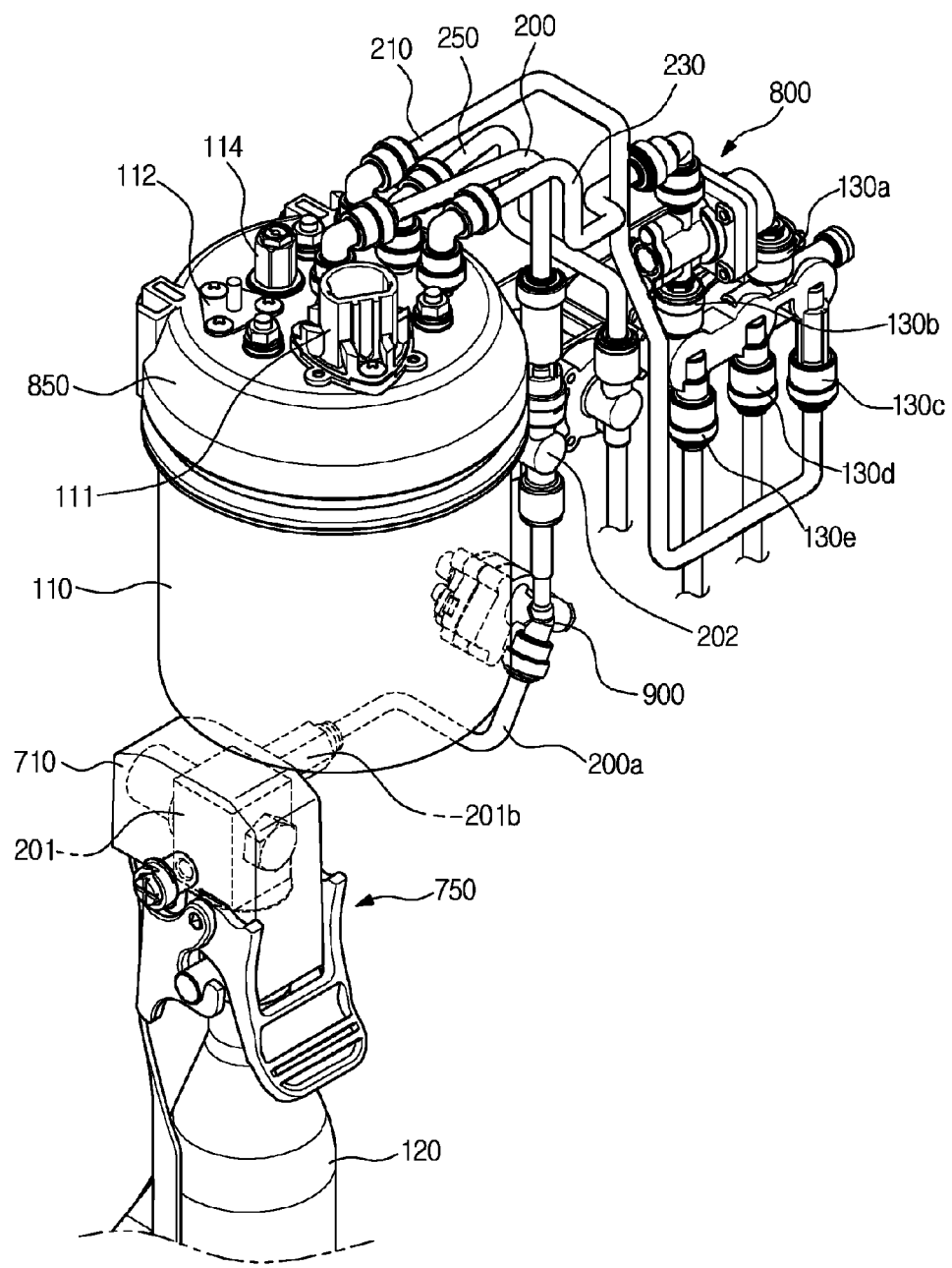

[Fig. 12]
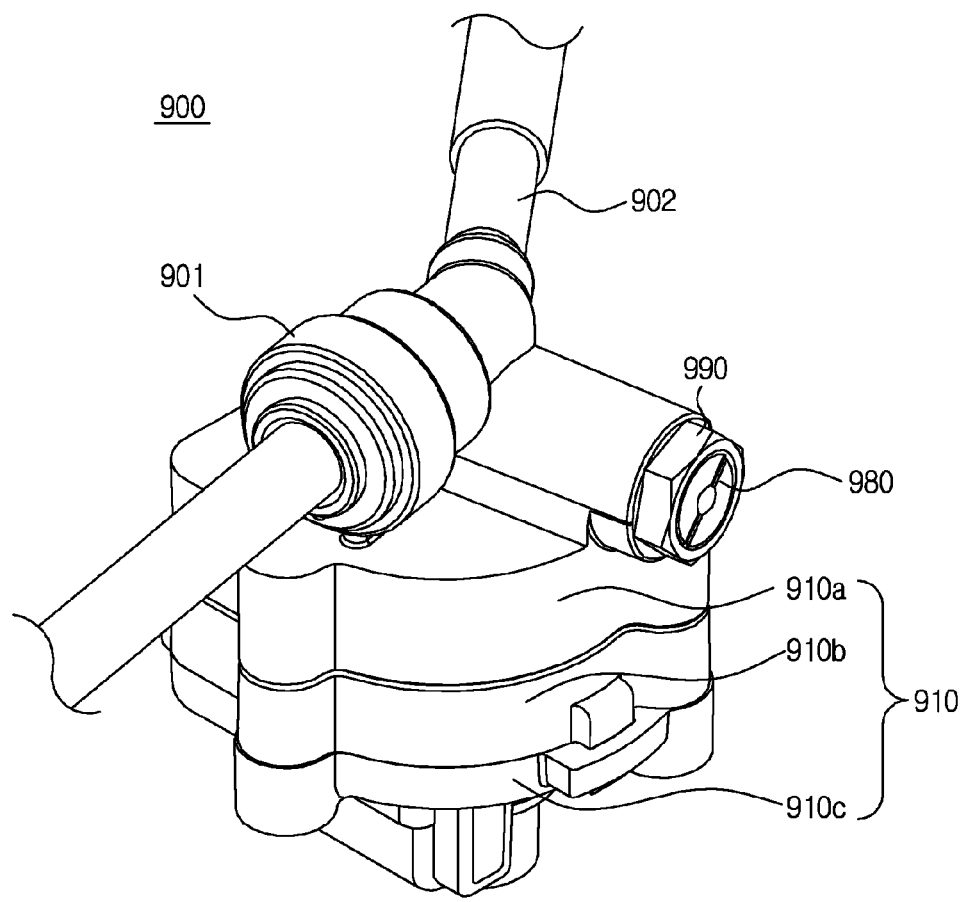

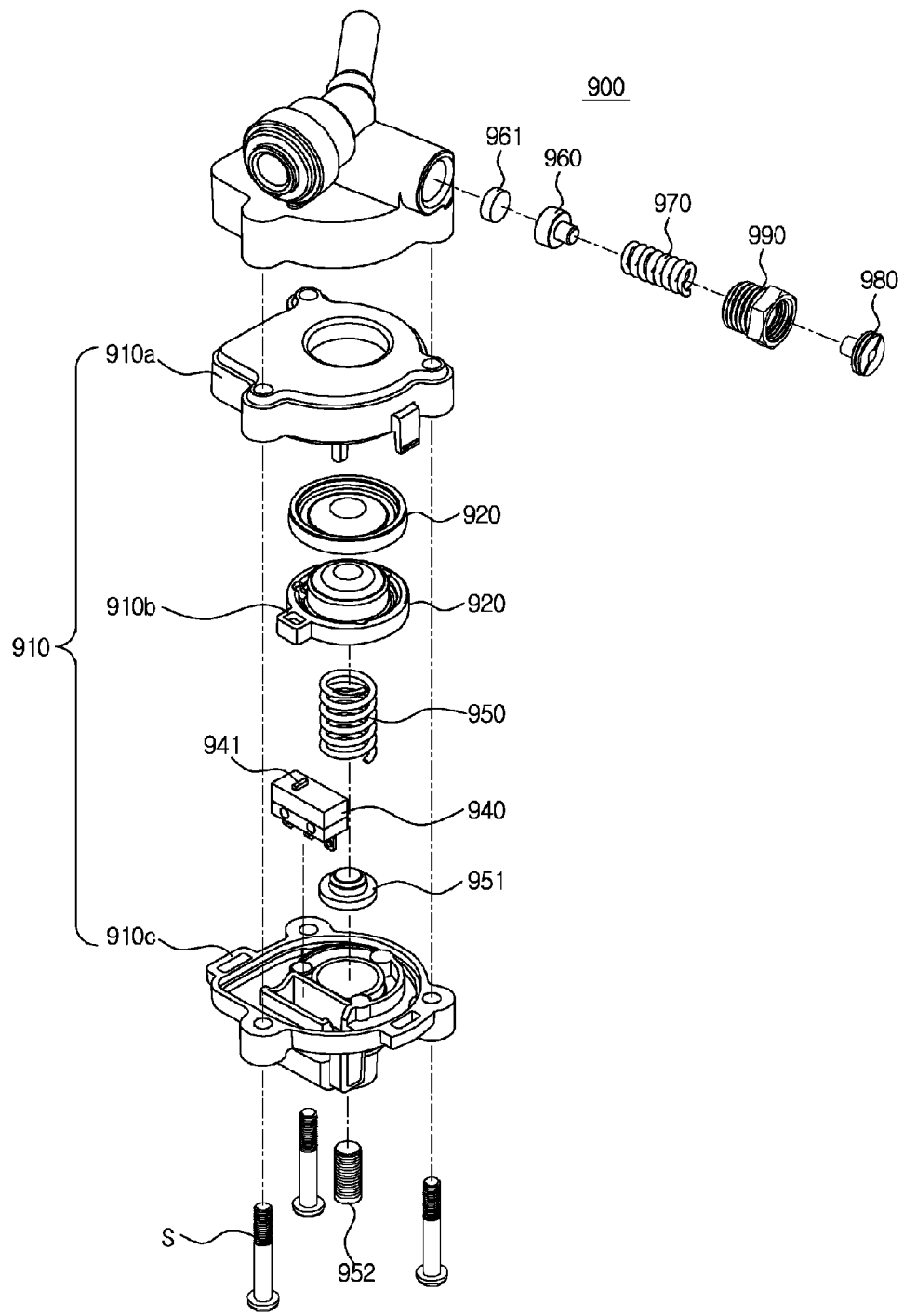
[Fig. 13]

[Fig. 14]
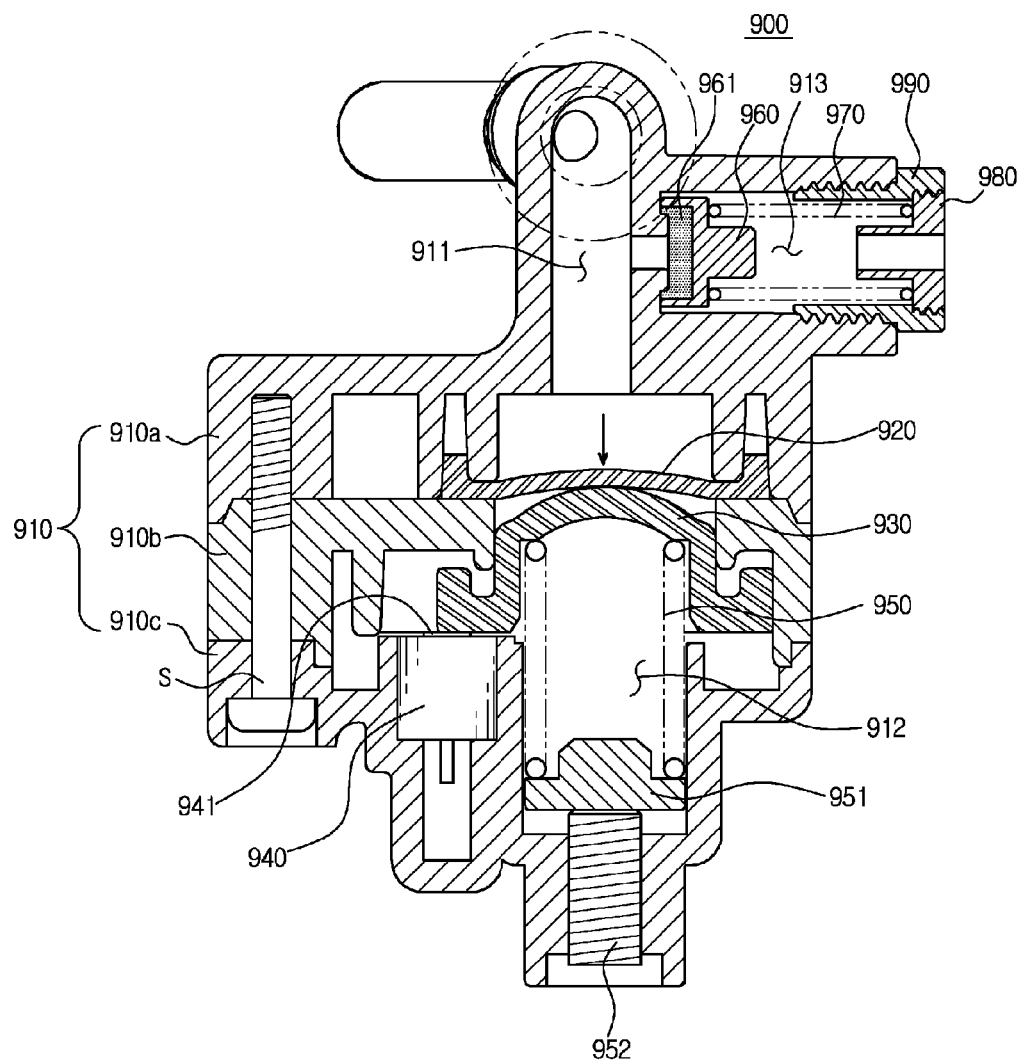

[Fig. 15]
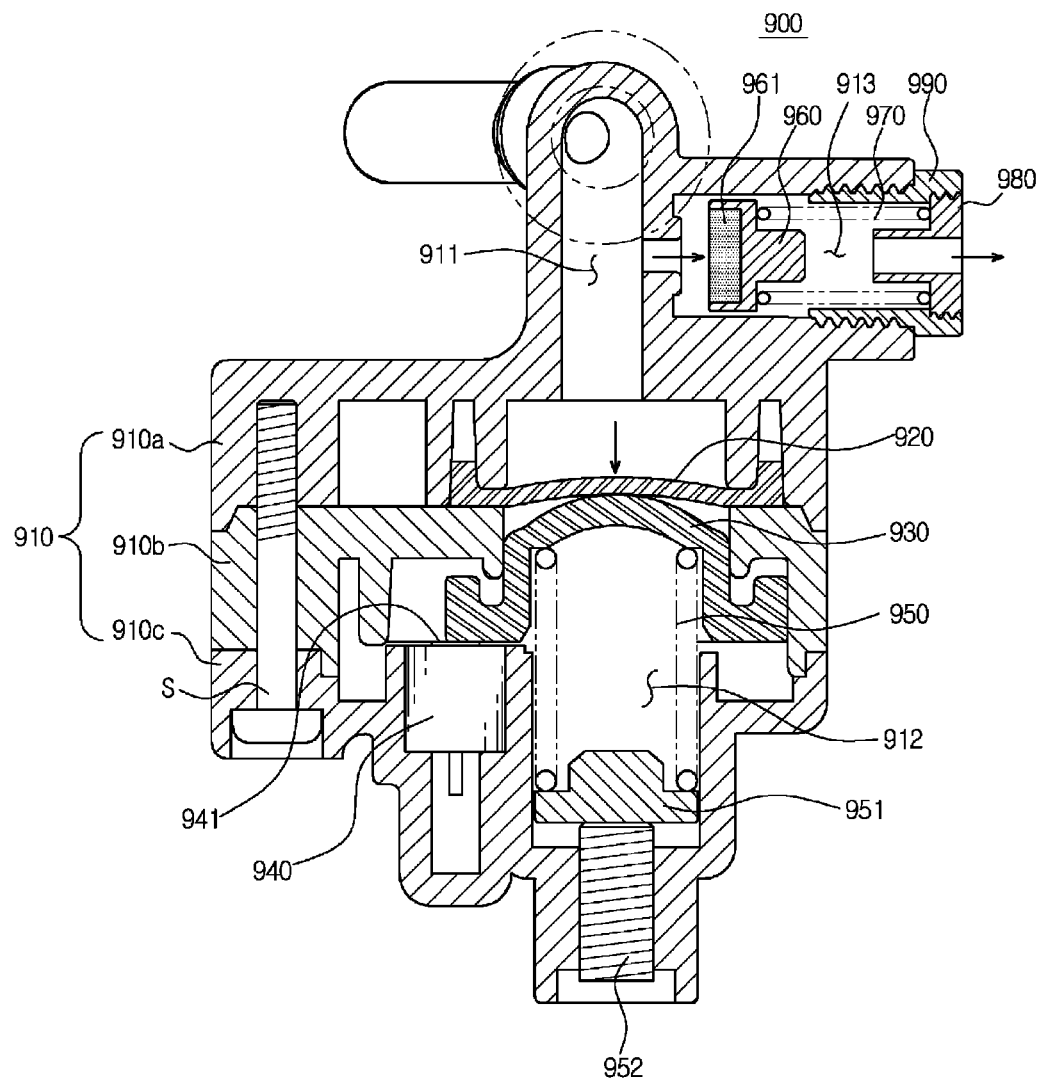

[Fig. 16]
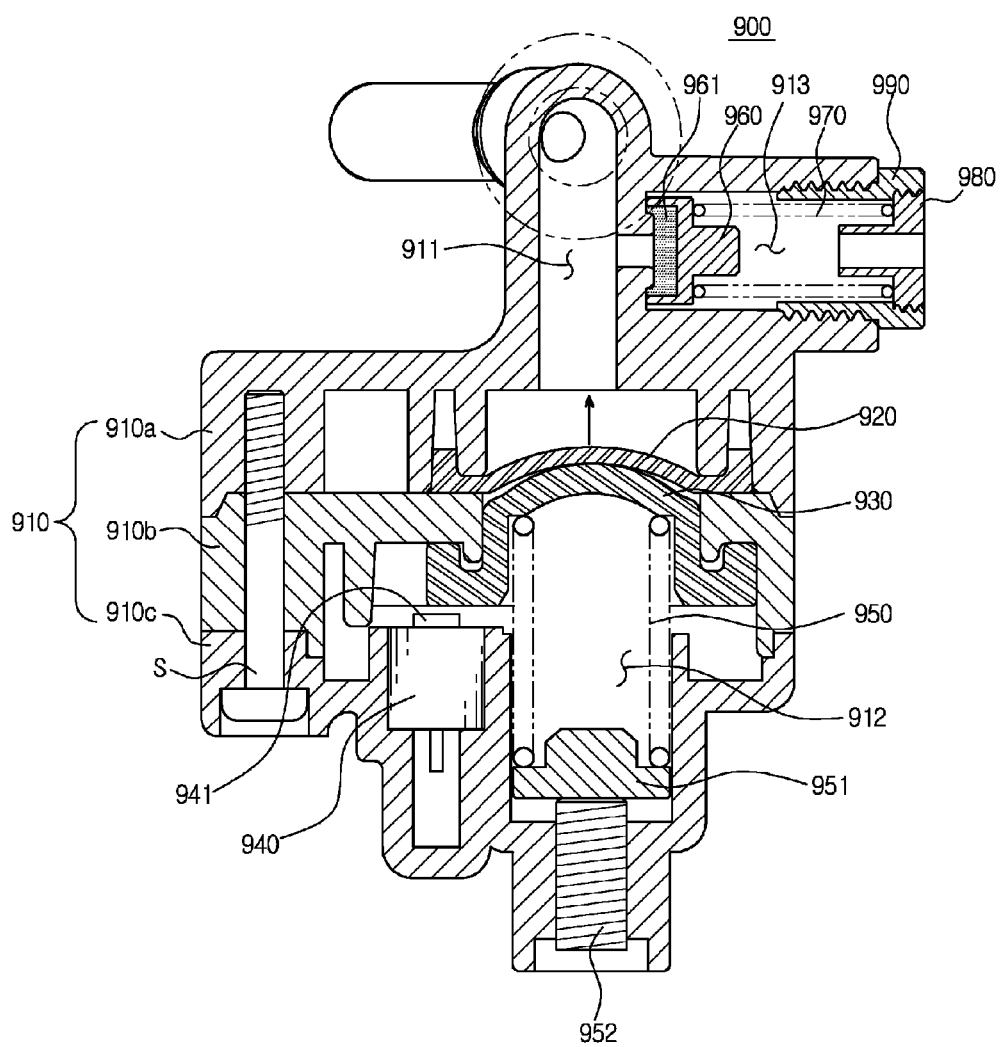

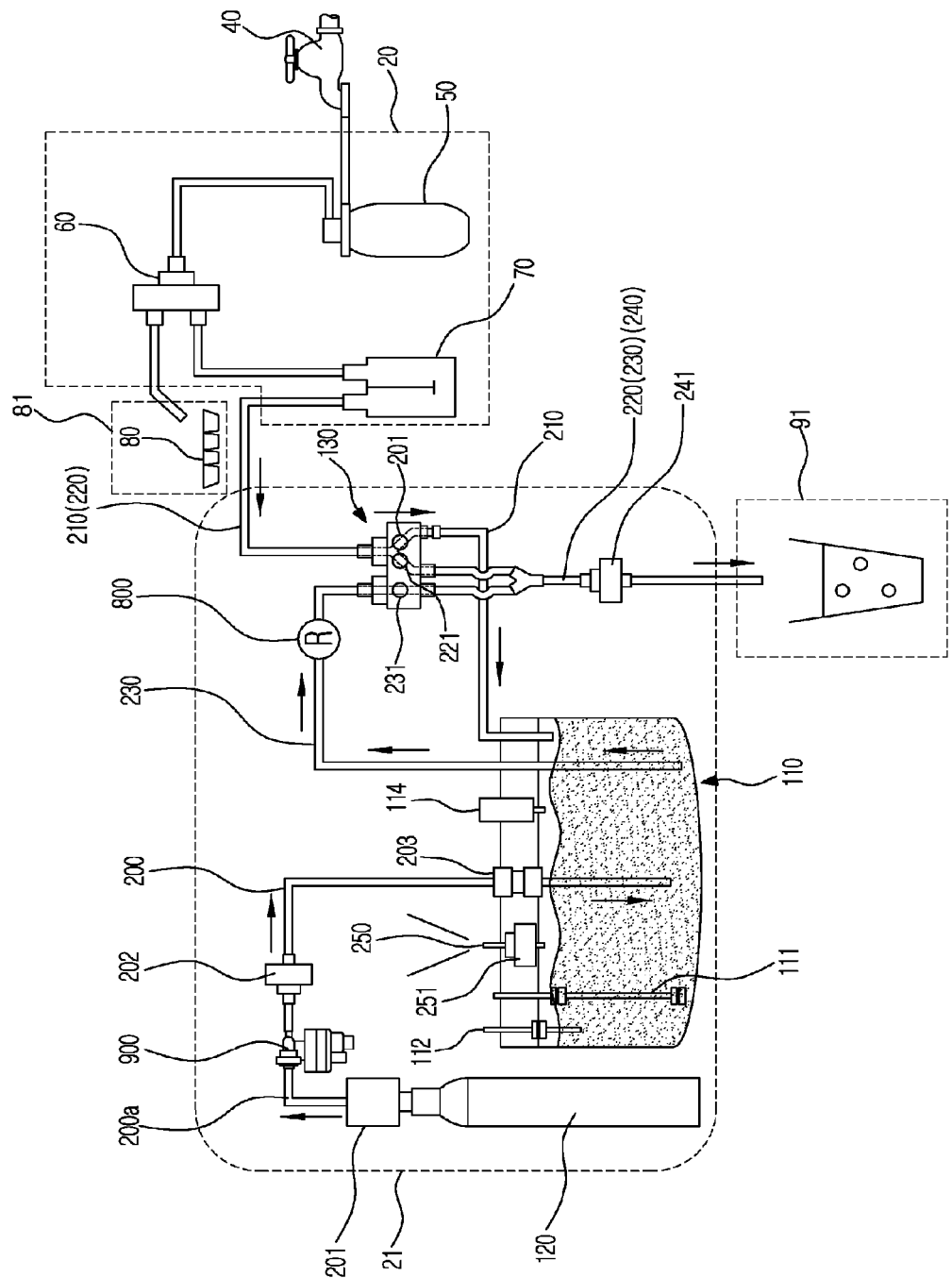
[Fig. 17]

[Fig. 18]
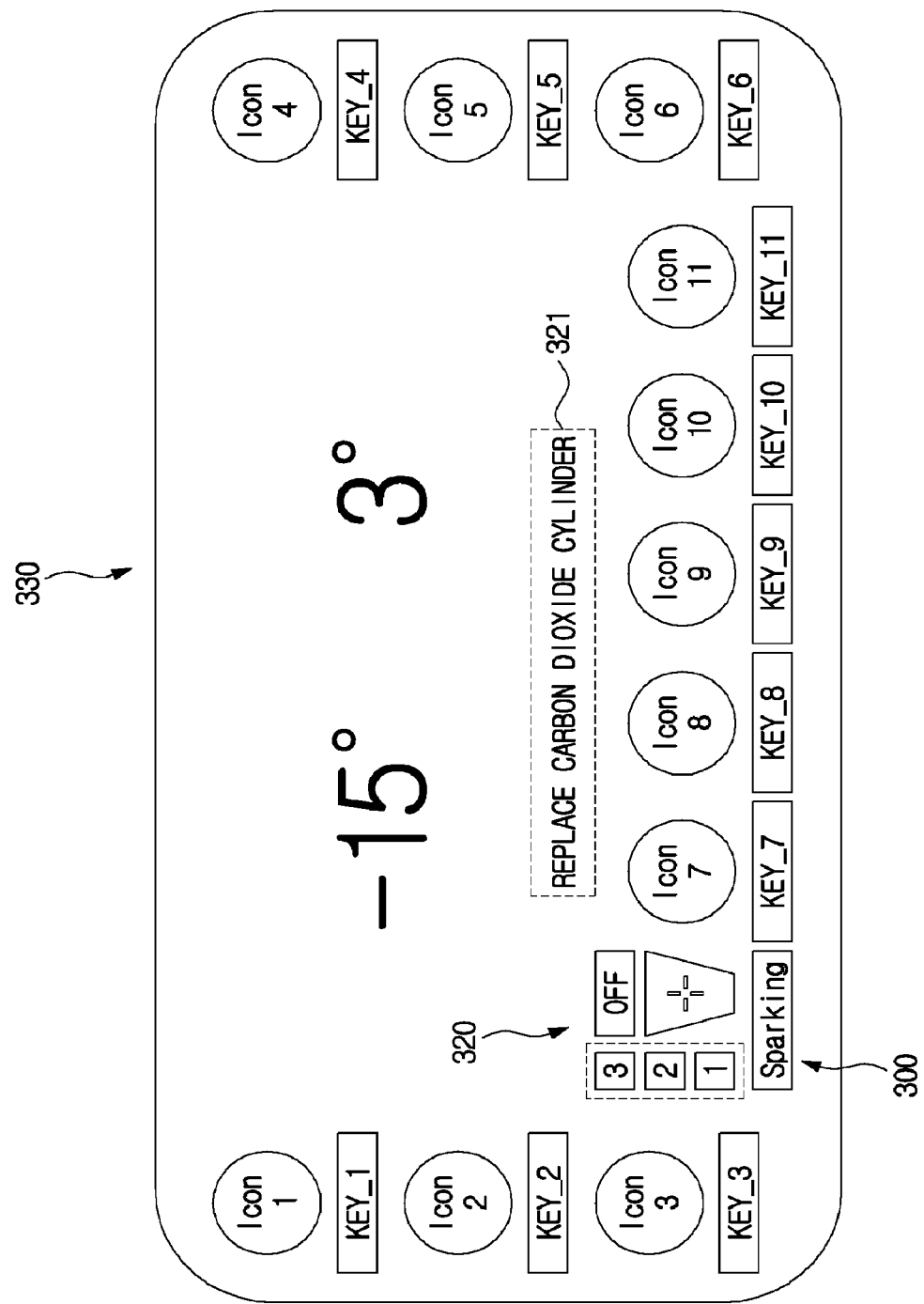

[Fig. 19]
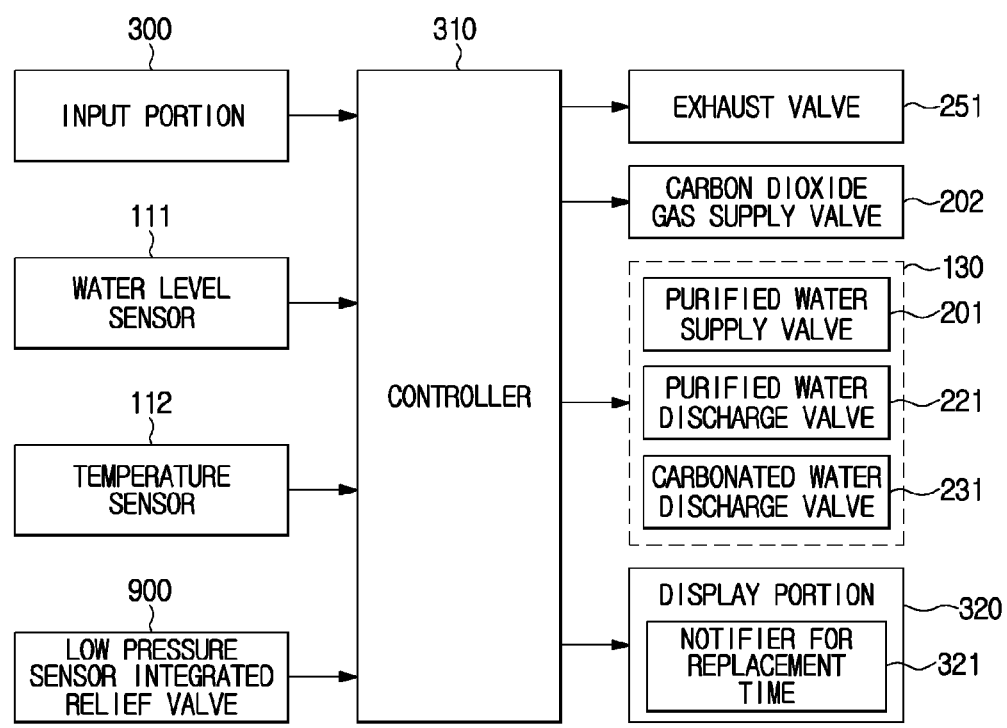

REFRIGERATOR

CROSS-REFERENCE TO RELATED APPLICATIONS

This application is a U.S. national stage application of International Application No. PCT/KR2014/007924 filed Aug. 26, 2014, and claims the benefit of Korean Application No. 10-2013-0106868, filed Sep. 5, 2013, in the Korean Intellectual Property Office, the disclosures of which are incorporated herein by reference.

BACKGROUND

1. Field

The present invention relates to a refrigerator having a carbonated water generating module.

2. Description of the Related Art

In general, refrigerators are devices which include storage chambers which store food and cold air supply units which supply cold air to the storage chambers, and thus maintain the freshness of the stored food. The refrigerators may include ice-making devices which make ice, and dispensers from which users extract water or the ice from the outside without opening doors to meet the requirement of the users, and furthermore, may also include carbonated water production devices which generate carbonated water.

The carbonated water production device includes a carbon dioxide cylinder in which a high pressure carbon dioxide gas is stored, and a carbonated water tank in which carbonated water is produced by mixing carbon dioxide and water.

In addition, the carbonated water production device includes a pressure regulator which adjusts a pressure of the carbon dioxide discharged from the carbon dioxide cylinder, and a solenoid switch valve which regulates supplying of the carbon dioxide discharged from the pressure regulator to the carbonated water tank.

When the carbon dioxide charged in the carbon dioxide cylinder is discharged, the pressure regulator adjusts the pressure thereof to about 8.5 bar for discharging the carbon dioxide. This is a suitable pressure for mixing the carbon dioxide and water in the carbonated water tank. When a connection channel between the pressure regulator and the solenoid switch valve is congested with the carbon dioxide discharged from the pressure regulator, the carbon dioxide may be heated by external heat and a pressure thereof can increase. When the pressure of the carbon dioxide increases as described above, there is a problem in that the solenoid switch valve cannot be opened.

In addition, since the carbon dioxide cylinder is a consumable component, when the carbon dioxide is all exhausted, the carbon dioxide cylinder should be replaced.

SUMMARY

Technical Problem

The present invention is directed to providing a refrigerator including a carbonated water production device which prevents a malfunction of a solenoid switch valve among a pressure regulator which adjusts a pressure of carbon dioxide charged in a carbon dioxide cylinder and discharges the carbon dioxide, and the solenoid switch valve which regulates supplying of the carbon dioxide discharged from the pressure regulator to a carbonated water tank even when the pressure of the carbon dioxide increases, and has a system having improved reliability and safety.

In addition, the present invention is also directed to providing a refrigerator including a notifier which senses when carbon dioxide charged in a carbon dioxide cylinder is consumed and when a replacement of the carbon dioxide cylinder is needed, and displays the replacement of the carbon dioxide cylinder to the outside.

Technical Solution

One aspect of the present invention provides a refrigerator including: a main body; a carbonated water tank in which carbon dioxide and water are mixed to produce carbonated water; a carbon dioxide cylinder in which carbon dioxide is charged; a pressure regulator which adjusts a pressure of carbon dioxide discharged from the carbon dioxide cylinder and discharges the carbon dioxide; a solenoid switch valve which regulates supplying of the carbon dioxide discharged from the pressure regulator to the carbonated water tank; a connection channel which connects the pressure regulator and the solenoid switch valve; and a relief valve which is provided in the connection channel to discharge carbon dioxide in the connection channel to the atmosphere when a pressure of the carbon dioxide in the connection channel is greater than a predetermined pressure limit.

A pressure of carbon dioxide which flows into the solenoid switch valve may be maintained equal to or less than the predetermined pressure limit by operating the relief valve, and a malfunction of the solenoid switch valve due to a high pressure may be prevented.

The predetermined pressure limit may be determined to be in the range of 9.5 to 11.5 bar.

The relief valve may include: a first relief valve body; a second relief valve body coupled to the first relief valve body; a relief main channel which is formed in the first relief valve body and having both ends each in communication with the connection channel; a relief discharge channel which is formed in the second relief valve body, has one end which communicates with the relief main channel, and the other end having an opening facing the outside; a relief switch member which moves forward or backward due to a pressure of carbon dioxide in the relief main channel and opens or closes the relief discharge channel; and a relief elastic member which elastically supports the relief switch member.

When a pressure of carbon dioxide in the connection channel is greater than the predetermined pressure limit, the relief switch member may move in one direction and open the relief discharge channel, and when a pressure of the carbon dioxide in the connection channel is less than the predetermined pressure limit, the relief switch member may move in a direction opposite the one direction, and close the relief discharge channel.

Another aspect of the present invention provides a refrigerator including: a main body; a storage chamber provided in the main body; a door which opens or closes the storage chamber; a carbonated water tank in which carbon dioxide and water are mixed to produce carbonated water; a carbon dioxide cylinder in which carbon dioxide is charged; a pressure regulator which adjusts a pressure of carbon dioxide discharged from the carbon dioxide cylinder and discharges the carbon dioxide; a solenoid switch valve which regulates supplying of the carbon dioxide discharged from the pressure regulator to the carbonated water tank; a connection channel which connects the pressure regulator and the solenoid switch valve; a notifier which notifies of a replacement time of the carbon dioxide cylinder; a low pressure sensor integrated relief valve which sends a low pressure signal when a pressure of carbon dioxide in the connection channel is less than a predetermined replacement pressure, and discharges the carbon dioxide in the connection channel when a pressure of the carbon dioxide in the connection channel is greater than a predetermined pressure limit; and a controller which receives the low pressure signal sent from the low pressure sensor integrated relief valve, and controls the notifier to notify of a replacement time of the carbon dioxide cylinder.

The notifier may include a display unit provided on the door.

A pressure of carbon dioxide which flows into the solenoid switch valve may be maintained equal to or less than the predetermined pressure limit by operating the low pressure sensor integrated relief valve, and a malfunction of the solenoid switch valve due to a high pressure may be prevented.

The predetermined replacement pressure may be determined to be in the range of 7.3 to 7.7 bar.

The predetermined pressure limit may be determined to be in the range of 9.5 to 11.5 bar.

The low pressure sensor integrated relief valve m installed at an inlet of the solenoid switch valve.

The low pressure sensor integrated relief valve may include: a valve body; a valve main channel which is formed in the valve body and has both ends in communication with the connection channel; a diaphragm installed in the valve body; a partition space partitioned from the valve main channel by the diaphragm; a pusher which moves forward or backward due to a pressure of carbon dioxide in the valve main channel; a micro switch which is pressed by the pusher and is turned on or off; and a pusher elastic member which elastically supports the pusher.

When a pressure of carbon dioxide in the connection channel is less than the replacement pressure, the pusher may move in one direction, be separated from the micro switch, and turn on the micro switch, and when a pressure of the carbon dioxide in the connection channel is greater than the replacement pressure, the pusher may move in a direction opposite the one direction, press the micro switch, and turn off the micro switch.

When the micro switch is turned on, the micro switch may send a low pressure signal to the controller.

The low pressure sensor integrated relief valve may include: a valve body; a valve main channel which is formed in the valve body and has both ends in communication with the connection channel; a valve discharge channel which is formed in the valve body, has one end in communication with the valve main channel, and the other end having an opening facing the outside; a valve switch member which moves forward or backward due to a pressure of carbon dioxide in the valve main channel and opens or closes the valve discharge channel; and a valve elastic member which elastically supports the valve switch member.

When a pressure of carbon dioxide in the connection channel is greater than the predetermined pressure limit, the valve switch member may move in one direction and open the valve discharge channel, and when a pressure of the carbon dioxide in the connection channel is less than the predetermined pressure limit, the switching member may move in another direction and close the valve discharge channel.

Still another aspect of the present invention provides a method of controlling a refrigerator which includes a carbonated water tank in which carbon dioxide and water are mixed to produce carbonated water, a carbon dioxide cylinder in which carbon dioxide is charged, a pressure regulator which adjusts a pressure of carbon dioxide discharged from the carbon dioxide cylinder and discharges the carbon dioxide, a solenoid switch valve which regulates supplying of the carbon dioxide discharged from the pressure regulator to the carbonated water tank, a connection channel which connects the pressure regulator and the solenoid switch valve, a notifier which notifies of a replacement time of the carbon dioxide cylinder, and a low pressure sensor integrated relief valve provided in the connection channel, the method including: sensing a pressure of carbon dioxide in the connection channel by the low pressure sensor integrated relief valve; displaying a replacement time by the notifier when the sensed pressure is less than a predetermined replacement pressure; and discharging the carbon dioxide in the connection channel to the atmosphere by the low pressure sensor integrated relief valve when the sensed pressure is greater than a predetermined pressure limit.

Advantageous Effects

According to exemplary embodiments of the present invention, a relief valve disposed between a pressure regulator and a carbon dioxide switching valve reduces a pressure of carbon dioxide by discharging the carbon dioxide to the atmosphere between the pressure regulator which adjusts the pressure of the carbon dioxide discharged from a carbon dioxide cylinder and discharges the carbon dioxide and a solenoid switch valve which regulates supplying of the carbon dioxide to a carbonated water tank, thereby the relief valve can prevent a malfunction of a solenoid switch valve due to a high pressure. Accordingly, the reliability and safety of the carbonated water making system can be improved.

A low pressure sensor which senses a low pressure of carbon dioxide is provided in the relief valve, when carbon dioxide has a pressure equal to or less than a predetermined replacement pressure, the low pressure sensor transmits a signal to a notifier, and thus the notifier can easily recognize that the replacement time of the carbon dioxide cylinder is close.

Since the relief valve and the low pressure sensor are integrally formed, components are simplified and the space utilization can be improved when compared to a case in which the relief valve and the low pressure sensor are provided separately.

BRIEF DESCRIPTION OF THE DRAWINGS

FIG. 1 is a perspective view illustrating an exterior of a refrigerator according to one embodiment of the present invention.

FIG. 2 is a perspective view illustrating an inside of the refrigerator of FIG. 1.

FIG. 3 is an exploded perspective view illustrating an assembly structure of a carbonated water generating module of the refrigerator of FIG. 1.

FIG. 4 is a perspective view when a cover of the carbonated water generating module of the refrigerator of FIG. 1 is separated therefrom.

FIG. 5 is an exploded perspective view illustrating a pressure regulator of the refrigerator of FIG. 1 and a peripheral structure thereof.

FIG. 6 is a cross-sectional view illustrating the pressure regulator of the refrigerator of FIG. 1 and the peripheral structure thereof.

FIG. 7 is a perspective view illustrating a relief valve of the refrigerator of FIG. 1 and a peripheral structure thereof.

FIG. 8 is a cross-sectional view illustrating a structure of the relief valve of the refrigerator of FIG. 1 when the relief valve is closed.

FIG. 9 is a cross-sectional view illustrating a structure of the relief valve of the refrigerator of FIG. 1 when the relief valve is open.

FIG. 10 is a circuit diagram for describing a process of generating and discharging carbonated water in the refrigerator of FIG. 1.

FIG. 11 is a perspective view illustrating a low pressure sensor integrated relief valve of a refrigerator according to another embodiment of the present invention and a peripheral structure thereof.

FIG. 12 is a view illustrating a coupling relationship of the low pressure sensor integrated relief valve of the refrigerator of FIG. 11.

FIG. 13 is an exploded perspective view illustrating a structure of the low pressure sensor integrated relief valve of the refrigerator of FIG. 11.

FIG. 14 is a cross-sectional view illustrating the low pressure sensor integrated relief valve of the refrigerator of FIG. 11 when a valve discharge channel is closed and a micro switch is turned off.

FIG. 15 is a cross-sectional view illustrating the low pressure sensor integrated relief valve of the refrigerator of FIG. 11 when the valve discharge channel is open and the micro switch is turned off.

FIG. 16 is a cross-sectional view illustrating the low pressure sensor integrated relief valve of the refrigerator of FIG. 11 when the valve discharge channel is closed and the micro switch is turned on.

FIG. 17 is a circuit diagram for describing a process of generating and discharging carbonated water in the refrigerator of FIG. 11.

FIG. 18 is a view illustrating a replacement notifier of a carbon dioxide cylinder of the refrigerator of FIG. 11.

FIG. 19 is a control block diagram of the refrigerator of FIG. 11.

DETAILED DESCRIPTION

Hereinafter, exemplary embodiments of the present invention will be described in detail.

FIG. 1 is a perspective view illustrating an exterior of a refrigerator according to one embodiment of the present invention, and FIG. 2 is a perspective view illustrating an inside of the refrigerator of FIG. 1.

Referring to FIGS. 1 and 2, the refrigerator 1 according to one embodiment of the present invention may include a main body 10, storage chambers 20 and 30 formed in the main body 10, and a cold air supply unit (not shown) which supplies cold air to the storage chambers 20 and 30.

The main body 10 may include inner boxes forming the storage chambers 20 and 30, an outer box which is coupled to outer sides of the inner boxes and forms an exterior of the refrigerator, and an insulation material which is disposed between the inner boxes and the outer box and insulates the storage chambers 20 and 30.

The storage chambers 20 and 30 may be partitioned into a refrigerator compartment 20 positioned at an upper portion and a freezer compartment 30 positioned at a lower portion by an intermediate partition 11. Shelves 23 on which food may be placed, and at least one storage box 27 which keeps food in a sealed state may be provided in the refrigerator compartment 20.

In addition, an ice-making chamber 81 capable of generating ice may be formed at an upper corner of the refrigerator compartment 20. The ice-making chamber 81 may be insulated and partitioned from the refrigerator compartment 20 by an ice-making chamber case 82. An ice-making device 80 such as an ice-making tray and an ice bucket which stores the ice generated in the ice-making tray may be provided in the ice-making chamber 81.

Meanwhile, a water tank 70 capable of storing water may be provided in the refrigerator compartment 20. As illustrated in FIG. 2, the water tank 70 may be provided between a plurality of storage boxes 27, but is not limited thereto. The water tank 70 may be provided in the refrigerator compartment 20 so that water in the water tank 70 is cooled due to cold air in the refrigerator compartment 20.

The water tank 70 may be connected to an external water source 40 (see FIG. 10) such as tap water, and may store water purified by a water purifying filter 50 (see FIG. 10). A channel switching valve 60 may be provided in a water supply pipe which connects the external water source 40 and the water tank 70, the channel switching valve 60 may selectively supply water supplied by the external water source 40 to the water tank 70 or the ice-making device 80.

Each of the refrigerator compartment 20 and the freezer compartment 30 has an open front through which food is introduced or withdrawn, the open front of the refrigerator compartment 20 may be opened or closed by a pair of rotational doors 21 and 22 hinge-coupled to the main body 10, and the open front of the freezer compartment 30 may be opened or closed by a sliding door 31 which is movable by sliding with respect to the main body 10. A door guard 24 which may store food may be provided on the rear surface of the refrigerator compartment doors 21 and 22.

Meanwhile, gaskets 28 which seal between the refrigerator compartment doors 21 and 22 and the main body 10 to keep cold air of the refrigerator compartment 20 when the refrigerator compartment doors 21 and 22 are closed may be provided at edges of the rear surfaces of the refrigerator compartment doors 21 and 22. In addition, a rotational bar 26 which seals between the refrigerator compartment door 21 and the refrigerator compartment door 22 to keep the cold air of the refrigerator compartment 20 when the refrigerator compartment doors 21 and 22 are closed may be provided at any one refrigerator compartment door of the refrigerator compartment doors 21 and 22.

In addition, a dispenser 90 which may extract water or ice from the outside without opening the refrigerator compartment door 21 may be provided in any one refrigerator compartment door of the refrigerator compartment doors 21 and 22.

The dispenser 90 may include a water-intake space 91 into which a container, such as a cup, is inserted and through which water or ice may be withdrawn, a control panel 92 in which input buttons through which various settings of the dispenser 90 are input and a display which displays various types of information of the dispenser 90 are provided, and an operation lever 93 which may operate the dispenser 90 to discharge water or ice.

In addition, the dispenser 90 may include an ice guide channel 94 which connects the ice-making device 80 and the water-intake space 91 to discharge ice generated by the ice-making device 80 to the water-intake space 91.

Meanwhile, a carbonated water generating module 100 which generates carbonated water may be installed at a rear surface of the refrigerator compartment door 21 in which the dispenser 90 of the refrigerator 1 according to one embodiment of the present invention is provided. The carbonated water generating module 100 will be described in detail below.

FIG. 3 is an exploded perspective view illustrating an assembly structure of a carbonated water generating module of the refrigerator of FIG. 1, FIG. 4 is a perspective view when a cover of the carbonated water generating module of the refrigerator of FIG. 1 is separated therefrom, FIG. 5 is an exploded perspective view illustrating a pressure regulator of the refrigerator of FIG. 1 and a peripheral structure thereof, FIG. 6 is a cross-sectional view illustrating the pressure regulator of the refrigerator of FIG. 1 and the peripheral structure thereof, FIG. 7 is a perspective view illustrating a relief valve of the refrigerator of FIG. 1 and a peripheral structure thereof, FIG. 8 is a cross-sectional view illustrating a structure of the relief valve of the refrigerator of FIG. 1 when the relief valve is closed, FIG. 9 is a cross-sectional view illustrating a structure of the relief valve of the refrigerator of FIG. 1 when the relief valve is open, and FIG. 10 is a circuit diagram for describing a process of generating and discharging carbonated water in the refrigerator of FIG. 1.

Referring to FIGS. 3 to 10, the carbonated water generating module 100 for generating carbonated water in the refrigerator 1 may include a carbon dioxide cylinder 120 in which high pressure carbon dioxide is charged, a carbonated water tank 110 in which water and carbon dioxide are mixed to produce carbonated water, a module case 140 which has accommodation spaces 151, 152, and 153 which accommodate the carbon dioxide cylinder 120 and the carbonated water tank 110 and is coupled to the rear surface of the refrigerator compartment door 21, and an integrated valve assembly 130.

The high pressure carbon dioxide in the range of about 45 to 60 bar may be charged in the carbon dioxide cylinder 120. The carbon dioxide cylinder 120 may be installed in a cylinder connector 157 of the module case 140, and may be accommodated in a lower accommodation space 153 of the module case 140.

A carbon dioxide gas in the carbon dioxide cylinder 120 may be supplied to the carbonated water tank 110 through a carbon dioxide supply channel 200 which connects the carbon dioxide cylinder 120 and the carbonated water tank 110.

A pressure regulator 201 which adjusts a pressure of a carbon dioxide gas, a solenoid switch valve 202 which opens or closes the carbon dioxide supply channel 200, and a carbon dioxide gas backflow prevention valve 203 which prevents backflow of a carbon dioxide gas may be provided in the carbon dioxide supply channel 200.

The pressure regulator 201 may decrease a pressure of a carbon dioxide gas discharged from the carbon dioxide cylinder 120 to about 8.5 bar to discharge the carbon dioxide gas.

Carbonated water is generated by mixing carbon dioxide supplied by the carbon dioxide cylinder 120 and purified water supplied by the water tank 70 in the carbonated water tank 110 which may store the generated carbonated water.

The carbonated water tank 110 may be connected with a water supply channel 210 to which water is supplied from the water tank 70, a carbonated water discharge channel 230 which discharges the generated carbonated water to the water-intake space 91, an exhaust channel 250 which discharges residual carbon dioxide gas in the carbonated water tank 110 before supplying water to the carbonated water tank 110, as well as the above-described carbon dioxide supply channel 200.

A water supply solenoid valve 211 which opens or closes a water supply channel 210 may be provided in the water supply channel 210. A carbonated water discharge solenoid valve 231 which opens or closes the carbonated water discharge channel 230, and a carbonated water regulator 232 which adjusts a pressure of discharged carbonated water may be provided in the carbonated water discharge channel 230. An exhaust valve 251 which opens or closes the exhaust channel 250 may be provided in the exhaust channel 250.

Meanwhile, a water level sensor 111 capable of measuring an amount of water supplied to the carbonated water tank 110, and a temperature sensor 112 capable of measuring a temperature of water supplied to the carbonated water tank 110 or a temperature of carbonated water generated by the carbonated water tank 110 may be provided in the carbonated water tank 110.

In addition, a tank safety valve 114, which may discharge a high pressure carbon dioxide gas when the high pressure carbon dioxide gas having a pressure more than a predetermined pressure is supplied to the carbonated water tank 110 due to a malfunction of the pressure regulator 201 and the like, may be provided in the carbonated water tank 110.

The above-described carbonated water tank 110 may be formed to have a predetermined size, and may be formed to accommodate about 1 l of purified water. In addition, the carbonated water tank 110 may be formed of a stainless material to minimize a space occupied thereby, withstand high pressure, and have corrosion resistance. The carbonated water tank 110 may be accommodated in a first upper accommodation space 151 of the module case 140. The carbonated water tank 110 may be supported by a bottom support portion 155 of the module case 140 and a guide portion 156.

Meanwhile, the integrated valve assembly 130 may be formed with the above-described water supply solenoid valve 211, the carbonated water discharge solenoid valve 231, and a water discharge solenoid valve 221.

That is, the water supply solenoid valve 211, the carbonated water discharge solenoid valve 231, and the water discharge solenoid valve 221 may be integrally formed as one unit. The above-described integrated valve assembly 130 may be accommodated in a second upper accommodation space 152 of the module case 140.

The module case 140 may include a back case 150 having one open side, and a cover 160 coupled to the one open side of the back case 150.

At least one insertion groove 154 may be formed at a position corresponding to at least one insertion protrusion 25 formed on the rear surface of the refrigerator compartment door 21, in the module case 140. Accordingly, as the insertion protrusion 25 is inserted into the insertion groove 154, the module case 140 may be easily installed on the rear surface of the refrigerator compartment door 21. However, the above-described coupling structure is only an example, and the module case 140 may be detachably installed on the rear surface of the refrigerator compartment door 21 using various coupling structures, such as a screw coupling structure and a hook coupling structure, as well as the above-described insertion structure.

In addition, an insertion groove 158 and an insertion protrusion 162 may be formed at positions respectively corresponding to each other in the back case 150 and the cover 160 such that the cover 160 is coupled to the back case 150. However, the above-described coupling structure is also an example, and the back case 150 and the cover 160 may be detachably coupled to each other using various coupling structures.

Meanwhile, when the cover 160 is coupled to the back case 150, the carbon dioxide cylinder 120 in the module case 140, the carbonated water tank 110, and the integrated valve assembly 130 may not be exposed to the outside. Accordingly, the aesthetic value of the refrigerator compartment door 21 may not be decreased.

However, since a ventilation opening 161 through which an inside of the module case 140 is communicated with the outside is formed in the cover 160, even when the cover 160 is coupled to the back case 150, cold air in the storage chamber is supplied to the carbonated water tank 110 in the module case 140, and carbonated water stored in the carbonated water tank 110 may be cooled or maintained at an optimum temperature.

An installation structure of the carbon dioxide cylinder 120 and an operation of the pressure regulator 201 will be described with reference to FIGS. 5 to 7.

The refrigerator further includes a safety unit 750 which couples the carbon dioxide cylinder 120 coupled to the cylinder connector 157 to the pressure regulator 201. The safety unit 750 includes a safety lever 752 which is pivotably provided at a side of the cylinder connector 157 coupled to one side of the carbon dioxide cylinder 120 and selectively moves the carbon dioxide cylinder 120 toward or away from the pressure regulator 201 according to rotation.

The cylinder connector 157 includes a cylinder connector main body 157a having a cylindrical shape, a cylinder connector hole 157b into which an suction nozzle 201a of the pressure regulator 201 is inserted, a cylinder connector movable shaft 157c formed to protrude from the cylinder connector main body 157a, and a cylinder coupling portion 157d to which a spray nozzle of the carbon dioxide cylinder 120 is screw coupled.

Even after the carbon dioxide cylinder 120 is coupled to the cylinder connector 157, the suction nozzle 201a of the pressure regulator 201 and the spray nozzle of the carbon dioxide cylinder 120 are provided to be separated by a predetermined distance. This is for preventing the suction nozzle 201a of the pressure regulator 201 and the spray nozzle of the carbon dioxide cylinder 120 from coupling together without an operation of the safety unit 750 even when the carbon dioxide cylinder 120 is coupled to the cylinder connector 157.

The safety lever 752 includes a lever portion 754 which receives a force, a lever side portion 756 including a lever rotational shaft portion 756a provided so that the safety lever 752 is pivotable, and a cylinder connector separation portion 758 which is provided at the lever side portion 756 and pushes away the cylinder connector movable shaft 157c.

As the lever portion 754 is provided to vertically move about the lever rotational shaft portion 756a provided in the lever side portion 756, and the lever portion 754 is vertically moved, the cylinder connector 157 may be detached from the pressure regulator 201.

The lever side portion 756 is formed to be bent from the lever portion 754 toward both sides, and the lever side portion 756 includes the lever rotational shaft portion 756a provided so that the lever portion 754 is pivotable at a side of the pressure regulator 201.

The safety unit 750 includes a safety lever holder 760 for converting a rotary motion of the safety lever 752 into a forward or backward motion of the cylinder connector 157.

The safety lever holder 760 is a component provided at a rear surface of the pressure regulator 201, and includes a holder coupling shaft 760b coupled to the safety lever 752, and a cylinder connector seating groove 760a in which the cylinder connector movable shaft 157c is seated.

A safety lever coupling shaft 756b is provided at the lever side portion 756 of the safety lever 752 to be coupled to the safety lever holder 760. The safety lever coupling shaft 756b is provided to be separated from the lever rotational shaft portion 756a. As the holder coupling shaft 760b and the safety lever coupling shaft 756b of the safety lever holder 760 are coupled, the rotary motion of the safety lever 752 is transferred to the safety lever holder 760.

Specifically, when the lever portion 754 is moved upward about the lever rotational shaft portion 756a, the safety lever coupling shaft 756b and the holder coupling shaft 760b are moved upward, and thus the safety lever holder 760 is moved upward. When the lever portion 754 is moved downward, the safety lever coupling shaft 756b and the holder coupling shaft 760b are moved downward, and thus the safety lever holder 760 is moved downward.

The cylinder connector seating groove 760a in which the cylinder connector movable shaft 157c is seated is provided to have a recessed shape in the safety lever holder 760. The cylinder connector seating groove 760a is seated to support a lower portion of the cylinder connector movable shaft 157c. As the safety lever holder 760 is moved upward with the above-described structure, the cylinder connector movable shaft 157c is moved upward.

The pressure regulator 201 includes a cylinder connector rail case 201c to surround the cylinder connector 157. A cylinder connector rail 201d which guides a vertical movement of the cylinder connector movable shaft 157c is provided in a side of the cylinder connector rail case 201c.

A pressure regulator rotational shaft 711, which protrudes from a side to have a shaft shape so that the pressure regulator 201 is pivotable, is provided in a side of the pressure regulator 201. As an outer surface of the pressure regulator 201 is surrounded by a pressure regulator case 710, an inner structure of the pressure regulator 201 may be protected from the external environment.

A gas cylinder guide portion 780 which guides the carbon dioxide cylinder 120 having a cylindrical shape may be provided at one side of the carbon dioxide cylinder 120. The gas cylinder guide portion 780 includes a cylinder close contacting guide portion 780a which guides at least one side of the carbon dioxide cylinder 120 in a lengthwise direction of the carbon dioxide cylinder 120 having the cylindrical shape while in close contact therewith, a cylinder separation guide portion 780b which is provided on the cylinder close contacting guide portion 780a and is separated from the carbon dioxide cylinder 120 by a predetermined distance, and a cylinder seating portion 780c on which a lower portion of the carbon dioxide cylinder 120 is seated.

Meanwhile, as well illustrated in FIG. 7, a relief valve 800 is provided in a connection channel 200a which connects the pressure regulator 201 and the solenoid switch valve 202, wherein the relief valve 800 decreases a pressure by discharging carbon dioxide in the connection channel 200a when the pressure of the carbon dioxide in the connection channel 200a is greater than a predetermined pressure limit.

Here, the connection channel 200a refers to a part of the carbon dioxide supply channel 200 which connects the pressure regulator 201 and the carbonated water tank 110 to supply carbon dioxide to the carbonated water tank 110, and refers to a section between the pressure regulator 201 and the solenoid switch valve 202 in the carbon dioxide supply channel 200.

The reason why the relief valve 800 is provided in the connection channel 200a is that the solenoid switch valve 202 does not operate normally when the connection channel 200a is congested with carbon dioxide and the carbon dioxide absorbs external heat to increase the temperature, and thus the pressure increases to a high pressure.

Specifically, as described above, although the carbon dioxide compressed at a pressure of about 45 to 60 bar and charged in the carbon dioxide cylinder 120 is discharged at a pressure of about 8.5 bar or less through the pressure regulator 201, according to an algorithm, when the solenoid switch valve 202 is closed, the connection channel 200a which connects the pressure regulator 201 and the solenoid switch valve 202 is congested with the carbon dioxide discharged from the pressure regulator 201. At this time, as the temperature of the carbon dioxide increases due to external heat, the pressure may increase to a high pressure of 8.5 bar or more.

Particularly, when the carbon dioxide cylinder 120 is excessively charged or a new carbon dioxide cylinder 120 is first installed, a pressure in the connection channel 200a may further increase. The reason is that, in the above-described case, as carbon dioxide flows fast in the pressure regulator 201, a temperature thereof decreases sharply, and the carbon dioxide is discharged from the pressure regulator 201 in a state in which the carbon dioxide is not evaporated sufficiently. The carbon dioxide discharged in a liquid state may absorb heat in the connection channel 200a, be evaporated, and have a further high pressure.

When a pressure of the solenoid switch valve 202 is about 15 bar or more, an opening operation is not performed easily according to an inner structure of the solenoid switch valve 202, and thus, when the carbon dioxide in the connection channel 200a has a high pressure of 15 bar or more, the solenoid switch valve 202 may be not opened.

The relief valve 800 may have a mechanical structure using an elastic force, and may be provided to discharge carbon dioxide to the atmosphere when the pressure of the carbon dioxide in the connection channel 200a reaches a predetermined pressure limit. Here, the predetermined pressure limit may be determined to be in the range of about 9.5 to 11.5 bar.

Using the above-described structure, when a pressure of carbon dioxide in the connection channel 200a increases and reaches a pressure limit, the relief valve 800 discharges the carbon dioxide to the atmosphere and maintains the pressure of the carbon dioxide in the connection channel 200a at the pressure limit or less. Accordingly, a malfunction of the solenoid switch valve 202 due to a high pressure may not occur, and thus the reliability and safety of a carbonated water manufacturing system may be improved.

The detail structure of the above-described relief valve 800 may be provided variously, and examples thereof may be provided as those illustrated in FIGS. 8 and 9.

The relief valve 800 may include a first relief valve body 810, a second relief valve body 820 coupled to the first relief valve body 810, a relief main channel 811 formed in the first relief valve body 810 and having both ends in communication with the connection channel 200a, a relief discharge channel 821 formed in the second relief valve body 820 and having one end which communicates with the relief main channel 811 and the other end having an opening facing the outside, a relief switch member 830 which moves forward or backward due to a pressure of carbon dioxide in the relief main channel 811 to open or close the relief discharge channel 821, and a relief elastic member 840 which elastically supports the relief switch member 830.

The relief valve 800 may also include an inlet 801 and an outlet 802 to which the connection channel 200a is connected, a packing member 831 provided in the relief switch member 830 to seal the relief discharge channel 821, and an adjusting screw 850 for adjusting an elastic force of the relief elastic member 840.

As illustrated in FIG. 9, when a pressure in the connection channel 200a is transferred to the relief main channel 811 using the above-described structure, and the pressure of the relief main channel 811 is greater than a predetermined pressure limit, the relief switch member 830 may overcome the elastic force of the relief elastic member 840, may move in one direction, and may open the relief discharge channel 821.

On the contrary, as illustrated in FIG. 8, when the pressure of the relief main channel 811 is less than the predetermined pressure limit, the relief switch member 830 may move in a direction opposite the one direction due to the elastic force of the relief elastic member 840, and may close the relief discharge channel 821.

FIG. 11 is a perspective view illustrating a low pressure sensor integrated relief valve of a refrigerator according to another embodiment of the present invention and a peripheral structure thereof, FIG. 12 is a view illustrating a coupling relationship of the low pressure sensor integrated relief valve of the refrigerator of FIG. 11, FIG. 13 is an exploded perspective view illustrating a structure of the low pressure sensor integrated relief valve of the refrigerator of FIG. 11, FIG. 14 is a cross-sectional view illustrating the low pressure sensor integrated relief valve of the refrigerator of FIG. 11 when a valve discharge channel is closed and a micro switch is turned off, FIG. 15 is a cross-sectional view illustrating the low pressure sensor integrated relief valve of the refrigerator of FIG. 11 when the valve discharge channel is open and the micro switch is turned off, FIG. 16 is a cross-sectional view illustrating the low pressure sensor integrated relief valve of the refrigerator of FIG. 11 when the valve discharge channel is closed and the micro switch is turned on, and FIG. 17 is a circuit diagram for describing a process of carbonated water generating and discharging of the refrigerator of FIG. 11.

A carbonated water production device of the refrigerator according to another embodiment of the present invention will be described in detail with reference to FIGS. 11 to 17. The same reference number as that of one embodiment of the present invention refers to the same component in the drawings and a detail description thereof may be omitted.

A refrigerator according to another embodiment of the present invention includes, instead of the relief valve of one embodiment, a low pressure sensor integrated relief valve 900, a notifier 321 which notifies of a replacement time of a carbon dioxide cylinder, and a controller 310 which receives a low pressure signal sent from the low pressure sensor integrated relief valve 900 and controls the notifier 321.

The low pressure sensor integrated relief valve 900 integrates a low pressure sensor which senses a low pressure of carbon dioxide when the carbon dioxide is at a low pressure, and a relief valve which discharges carbon dioxide to the atmosphere when the carbon dioxide is at a high pressure, and is installed on a connection channel 200a which connects a pressure regulator 201 and a solenoid switch valve 202.

When a pressure of carbon dioxide in the connection channel 200a is less than a predetermined replacement pressure, the low pressure sensor integrated relief valve 900 generates a low pressure signal, and when the pressure of the carbon dioxide in the connection channel 200a is greater than the predetermined replacement pressure, the low pressure sensor integrated relief valve 900 discharges the carbon dioxide in the connection channel 200a to the atmosphere.

As described above, the carbon dioxide cylinder 120 is charged at a pressure in the range of about 45 to 60 bar, and is consumable, a pressure of the carbon dioxide cylinder 120 decreases as carbon dioxide is consumed, and thus the carbon dioxide cylinder 120 has to be replaced when all of the carbon dioxide is consumed or the pressure thereof is not sufficient.

However, when the replacement time of the carbon dioxide cylinder 120 is not properly notified of, a user may recognize whether all of the carbon dioxide of the carbon dioxide cylinder 120 is consumed or the pressure thereof is not sufficient through only sipping carbonated water and tasting it.

To this end, the low pressure sensor integrated relief valve 900 senses first a pressure of carbon dioxide in the connection channel 200*a* and determines whether the pressure is low enough to need a replacement.

That is, when the pressure of the carbon dioxide in the connection channel 200*a* is less than the predetermined replacement pressure, the low pressure sensor integrated relief valve 900 generates a low pressure signal. Here, the predetermined replacement pressure may be determined to be in the range of about 7.3 to 7.7 bar.

As described above, since the pressure regulator 201 is provided to discharge carbon dioxide at a pressure of about 8.5 bar, when a pressure of carbon dioxide discharged from the pressure regulator 201 is in the range of 7.3 to 7.7 bar, a pressure of carbon dioxide of the carbon dioxide cylinder 120 has already reached a level in the range of 7.3 to 7.7 bar.

The notifier 321 may include a display provided on a door. Specifically, the notifier 321 may include a light emitting diode (LED) and the like, and may emit light to visually display that the replacement time of the carbon dioxide cylinder 120 has arrived.

When a pressure of carbon dioxide in the connection channel 200*a* is greater than a predetermined pressure limit, the low pressure sensor integrated relief valve 900 discharges the carbon dioxide in the connection channel 200*a* to the atmosphere and decreases the pressure of the carbon dioxide in the connection channel 200*a* similar to the relief valve of the above-described embodiment. Since an operation of discharging carbon dioxide is the same as that of the relief valve of the above-described embodiment, a detail description thereof will be omitted.

Here, the predetermined pressure limit at which the low pressure sensor integrated relief valve 900 is open may be determined to be in the range of 9.5 to 11.5 bar, similar to the above-described embodiment.

The detail structure of the low pressure sensor integrated relief valve 900 may be provided variously, and examples thereof may be provided as those illustrated in FIGS. 12 to 16.

The low pressure sensor integrated relief valve 900 may include a valve body portion 910 which includes an upper case 910*a*, a middle case 910*b*, and a lower case 910*c*, a valve main channel 911 which is formed in the valve body portion 910 and has both ends in communication with the connection channel 200*a*, a diaphragm 920 installed in the valve body portion 910, a partition space 912 partitioned from the valve main channel 911 by the diaphragm 920, a pusher 930 which moves forward or backward due to a pressure of carbon dioxide in the valve main channel 911, a micro switch 940 pressed by the pusher 930 to be turned on or off, a pusher elastic member 950 which elastically supports the pusher 930, a valve discharge channel 913 formed in the valve body portion 910 and having one end in communication with the valve main channel 911 and the other end having an opening facing the outside, a valve switch member 960 which moves forward or backward due to a pressure of carbon dioxide in the valve main channel 911 to open or close the valve discharge channel 913, and a valve elastic member 970 which elastically supports the valve switch member 960.

The upper case 910*a*, the middle case 901*b*, and the lower case 901*c* may be coupled by screws S.

The low pressure sensor integrated relief valve 900 may also include an inlet 901 and an outlet 902 which are connected to the connection channel 200*a*, a spring support portion 951 which supports the pusher elastic member 950, an adjusting screw 952 for adjusting an elastic force of the pusher elastic member 950, a packing member 961 provided in the valve switch member 960 to seal the valve discharge channel 913, an adjusting screw 980 for adjusting an elastic force of the valve elastic member 970, and a valve support body 990 coupled to the valve body portion 910.

As the outlet 902 is inserted into the inlet of the solenoid switch valve 202, the low pressure sensor integrated relief valve 900 may be installed at the solenoid switch valve 202.

The micro switch 940 may include an actuator 941 which protrudes to be pressed by the pusher 930, and when the actuator 941 is pressed by the pusher 930, the micro switch 940 may be turned off internally.

When the actuator 941 is released from the pressure of the pusher 930, the actuator 941 returns to an original state due to an elastic force of an elastic member in the micro switch 940, and when the actuator 941 returns to the original state, the micro switch 940 may be turned on.

However, the above-described operation of the micro switch 940 is only one example, when the pusher 930 presses the actuator 941, the micro switch 940 may also be turned on, and when the actuator 941 is released from the pressure of the pusher 930, the micro switch 940 may also be provided to be turned off, unlike the present embodiment. In the above-described case, the micro switch 940 has to be provided above the pusher 930 unlike the present embodiment.

Meanwhile, when a pressure in the connection channel 200*a* is transferred to the valve main channel 911 using the above-described structure, as illustrated in FIG. 14, and the pressure in the connection channel 200*a* is greater than a predetermined replacement pressure (about 7.3 to 7.7 bar) and smaller than a predetermined pressure limit (about 9.5 to 11.5 bar), the pusher 930 overcomes an elastic force of the pusher elastic member 950, moves in one direction, and presses the actuator 941 of the micro switch 940, and the micro switch 940 is turned off. The valve switch member 960 moves in one direction due to an elastic force of the valve elastic member 970, and closes the valve discharge channel 913.

As illustrated in FIG. 15, when the pressure in the connection channel 200, that is the pressure in the connection channel 200*a*, is greater than the predetermined pressure limit (about 9.5 to 11.5 bar), the valve switch member 960 overcomes an elastic force of the valve elastic member 970, moves in a direction opposite the one direction, and opens the valve discharge channel 913.

As illustrated in FIG. 16, when a pressure in the connection channel 200*a* is less than the predetermined replacement pressure (about 7.3 to 7.7 bar), the pusher 930 moves in a direction opposite the one direction due to an elastic force of the pusher elastic member 950, and is separated from the micro switch 940, and the micro switch 940 turns on.

When the micro switch 940 is turned on, the micro switch 940 sends a low pressure signal to the controller 310.

As described above, as the low pressure sensor which senses a pressure when a pressure of carbon dioxide is less than the predetermined replacement pressure, and the relief valve which discharges carbon dioxide to the atmosphere when the pressure of the carbon dioxide is greater than the predetermined pressure limit are integrated, components may be simplified and assembly may be easy compared to a structure in which a low pressure sensor and a relief valve are provided separately. In addition, since a space occupied thereby decreases, the utilization of the space may be improved.

FIG. 18 is a view illustrating a replacement notifier of a carbon dioxide cylinder of the refrigerator of FIG. 11, and FIG. 19 is a control block diagram of the refrigerator of FIG. 11.

A control method of the refrigerator according to another embodiment of the present invention will be described with reference to FIGS. 18 and 19.

The refrigerator according to another embodiment of the present invention may further include an input portion 300 through which discharging of carbonated water or purified water is input, a display portion 320 which indicates whether carbonated water is generated or not, and a controller 310 which controls an opening or closing of an exhaust valve 251, a solenoid switch valve 202, a water supply solenoid valve 211, a water discharge solenoid valve 221, and an carbonated water discharge solenoid valve 231, and an operation of the display portion 320 based on information received from a water level sensor 111, a temperature sensor 112, and the input portion 300.

The controller 310 may receive a low pressure signal sent from the micro switch 940 of the low pressure sensor integrated relief valve 900, and may control an operation of the display portion 320.

The input portion 300 and the display portion 320 may be provided in an integrated display unit 330, and the display portion 320 may include a notifier 321 which notifies of the replacement time of the carbon dioxide cylinder 120.

The low pressure sensor integrated relief valve 900 may sense a pressure of carbon dioxide in the connection channel 200a.

When the sensed pressure is less than a predetermined replacement pressure, the low pressure sensor integrated relief valve 900 may send the low pressure signal to the controller 310, and the controller 310 may control the notifier 321 of the display portion 320 to notify of a replacement time.

When the sensed pressure is greater than a predetermined pressure limit, the low pressure sensor integrated relief valve 900 is mechanically opened and may discharge carbon dioxide in the connection channel 200a to the atmosphere.

Although the scope of the present invention is described with reference to specific embodiments, the scope of the present invention is not limited to the embodiments. Various other embodiments that may be changed or modified by those skilled in the art without departing from the scope and spirit of the present invention defined by the appended claims fall within the scope of the present invention.

What is claimed is:

1. A refrigerator comprising:
a main body;
a carbonated water tank in which carbon dioxide and water are mixed to produce carbonated water;
a carbon dioxide cylinder in which carbon dioxide is charged;
a pressure regulator which adjusts a pressure of carbon dioxide discharged from the carbon dioxide cylinder and discharges the carbon dioxide;
a solenoid switch valve which regulates supplying of the carbon dioxide discharged from the pressure regulator to the carbonated water tank;
a connection channel which connects the pressure regulator and the solenoid switch valve; and
a relief valve which is provided in the connection channel to discharge carbon dioxide in the connection channel to the atmosphere when a pressure of the carbon dioxide in the connection channel is greater than a predetermined pressure limit,
wherein the relief valve includes:
a relief valve body;
a relief main channel formed in the relief valve body and having both ends each in communication with the connection channel;
a relief discharge channel formed in the relief valve body and having one end in communication with the relief main channel and the other end having an opening facing the outside; and
a relief switch member which moves forward or backward due to a pressure of carbon dioxide in the relief main channel and opens or closes the relief discharge channel.

2. The refrigerator of claim 1, wherein a pressure of carbon dioxide which flows into the solenoid switch valve is maintained equal to or less than the predetermined pressure limit by operating the relief valve, and a malfunction of the solenoid switch valve due to a high pressure is prevented.

3. The refrigerator of claim 1, wherein the predetermined pressure limit is determined to be in the range of 9.5 to 11.5 bar.

4. The refrigerator of claim 1, wherein the relief valve further includes:
a relief elastic member which elastically supports the relief switch member.

5. The refrigerator of claim 1, wherein when the pressure of carbon dioxide in the connection channel is greater than the predetermined pressure limit, the relief switch member moves in one direction and opens the relief discharge channel, and when the pressure of the carbon dioxide in the connection channel is less than the predetermined pressure limit, the relief switch member moves in a direction opposite the one direction, and closes the relief discharge channel.

6. A refrigerator comprising:
a main body;
a storage chamber provided in the main body;
a door which opens or closes the storage chamber;
a carbonated water tank in which carbon dioxide and water are mixed to produce carbonated water;
a carbon dioxide cylinder in which carbon dioxide is charged;
a pressure regulator which adjusts a pressure of carbon dioxide discharged from the carbon dioxide cylinder and discharges the carbon dioxide;
a solenoid switch valve which regulates supplying of the carbon dioxide discharged from the pressure regulator to the carbonated water tank;
a connection channel which connects the pressure regulator and the solenoid switch valve;
a notifier which notifies of a replacement time of the carbon dioxide cylinder;
a low pressure sensor integrated relief valve which sends a low pressure signal when a pressure of carbon dioxide in the connection channel is less than a predetermined replacement pressure, and discharges the carbon dioxide in the connection channel to the atmosphere when the pressure of the carbon dioxide in the connection channel is greater than a predetermined pressure limit; and a controller which receives the low pressure signal sent from the low pressure sensor integrated relief valve and controls the notifier to notify of a replacement time of the carbon dioxide cylinder.

7. The refrigerator of claim 6, wherein the notifier includes a display unit provided on the door.

8. The refrigerator of claim 6, wherein a pressure of carbon dioxide which flows into the solenoid switch valve is maintained equal to or less than the predetermined pressure limit by operating the low pressure sensor integrated relief valve, and a malfunction of the solenoid switch valve due to a high pressure is prevented.

9. The refrigerator of claim 6, wherein the predetermined replacement pressure is determined to be in the range of 7.3 to 7.7 bar.

10. The refrigerator of claim 6, wherein the predetermined pressure limit is determined to be in the range of 9.5 to 11.5 bar.

11. The refrigerator of claim 6, wherein the low pressure sensor integrated relief valve is installed at an inlet of the solenoid switch valve.

12. The refrigerator of claim 6, wherein the low pressure sensor integrated relief valve includes:
a valve body;
a valve main channel formed in the valve body and having both ends each in communication with the connection channel;
a diaphragm mounted in the valve body;
a partition space partitioned from the valve main channel by the diaphragm;
a pusher which moves forward or backward due to a pressure of carbon dioxide in the valve main channel;
a micro switch pressed by the pusher and turned on or off; and
a pusher elastic member which elastically supports the pusher.

13. The refrigerator of claim 12, wherein when the pressure of carbon dioxide in the connection channel is less than the replacement pressure, the pusher moves in one direction, is separated from the micro switch, and turns on the micro switch, and when the pressure of the carbon dioxide in the connection channel is greater than the replacement pressure, the pusher moves in a direction opposite the one direction, presses the micro switch, and turns off the micro switch.

14. The refrigerator of claim 13, wherein when the micro switch is turned on, the micro switch sends a low pressure signal to the controller.

15. The refrigerator of claim 6, wherein the low pressure sensor integrated relief valve includes:
a valve body;
a valve main channel formed in the valve body and having both ends each in communication with the connection channel;
a valve discharge channel formed in the valve body and having one end in communication with the valve main channel, and the other end having an opening facing the outside;
a valve switch member which moves forward or backward due to a pressure of carbon dioxide of the valve main channel and opens or closes the valve discharge channel; and
a valve elastic member which elastically supports the valve switch member.

16. The refrigerator of claim 15, wherein when the pressure of carbon dioxide in the connection channel is greater than the predetermined pressure limit, the valve switch member moves in one direction and opens the valve discharge channel, and when the pressure of the carbon dioxide in the connection channel is less than the predetermined pressure limit, the switching member moves in the other direction and closes the valve discharge channel.

17. A method of controlling a refrigerator including a carbonated water tank in which carbon dioxide and water are mixed to produce carbonated water, a carbon dioxide cylinder in which carbon dioxide is charged, a pressure regulator which adjusts a pressure of carbon dioxide discharged from the carbon dioxide cylinder and discharges the carbon dioxide, a solenoid switch valve which regulates supplying of the carbon dioxide discharged from the pressure regulator to the carbonated water tank, a connection channel which connects the pressure regulator and the solenoid switch valve, a notifier which notifies of a replacement time of the carbon dioxide cylinder, and a low pressure sensor integrated relief valve provided in the connection channel, the method comprising:
sensing a pressure of carbon dioxide in the connection channel by the low pressure sensor integrated relief valve;
displaying a replacement time by the notifier when the sensed pressure is less than a predetermined replacement pressure; and
discharging the carbon dioxide in the connection channel to the atmosphere by the low pressure sensor integrated relief valve when the sensed pressure is greater than a predetermined pressure limit.

* * * * *